Sept. 9, 1924.  
B. L. VAN ORMAN  
1,507,871
WIRE FEEDING MEANS FOR COILING, BENDING, OR OTHER WIRE FORMING MEANS
Filed Feb. 3, 1923    15 Sheets-Sheet 2
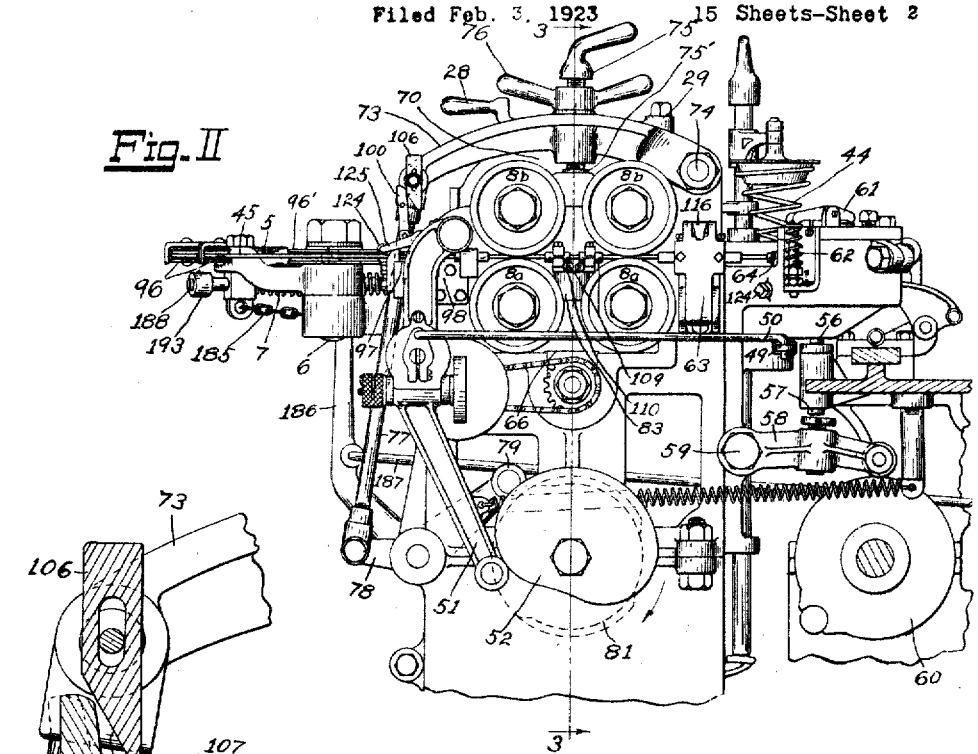
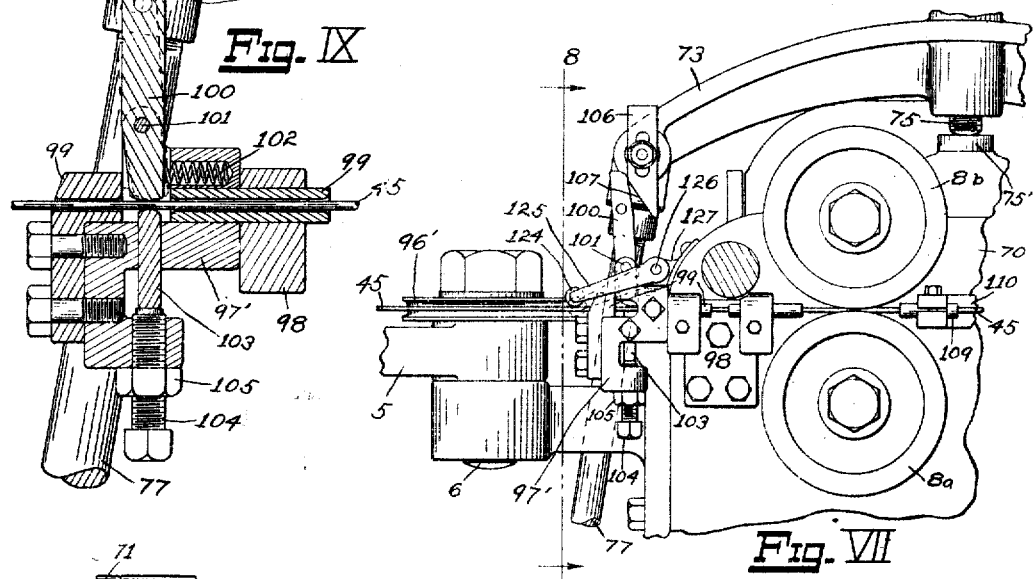
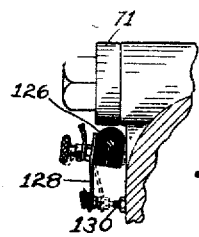
INVENTOR  
*Bert L. Van Orman*  
BY  
*Chappell & Earl*  
ATTORNEYS.

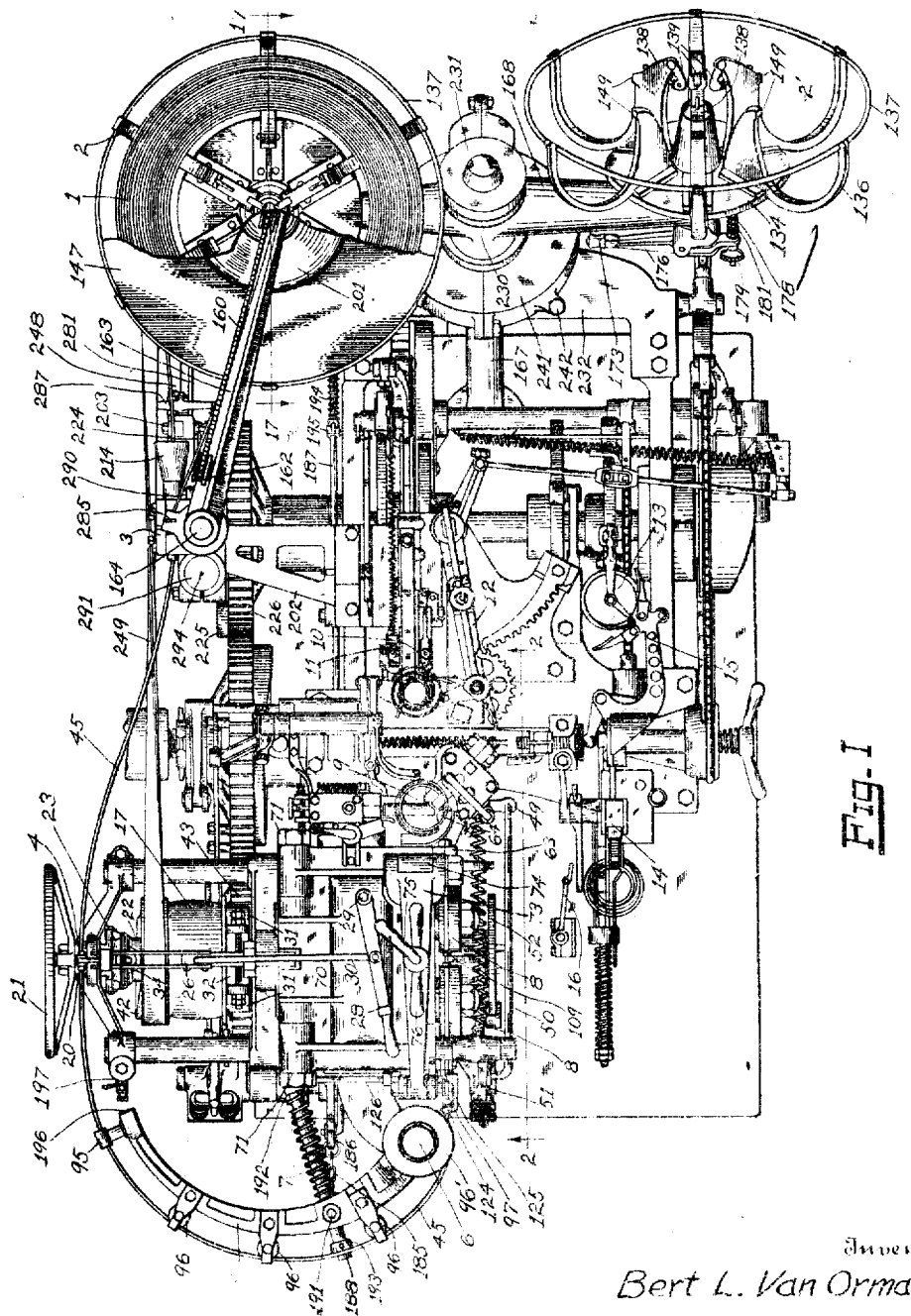

Sept. 9, 1924.  1,507,871
B. L. VAN ORMAN
WIRE FEEDING MEANS FOR COILING, BENDING, OR OTHER WIRE FORMING MEANS
Filed Feb. 3, 1923  15 Sheets-Sheet 3
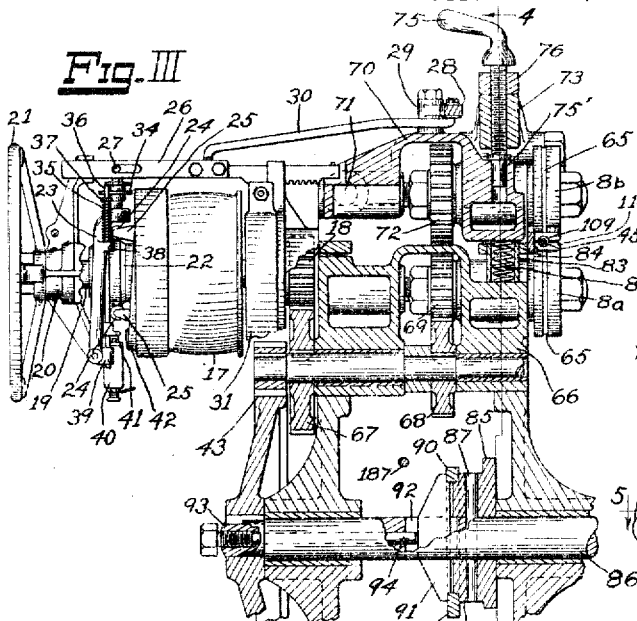
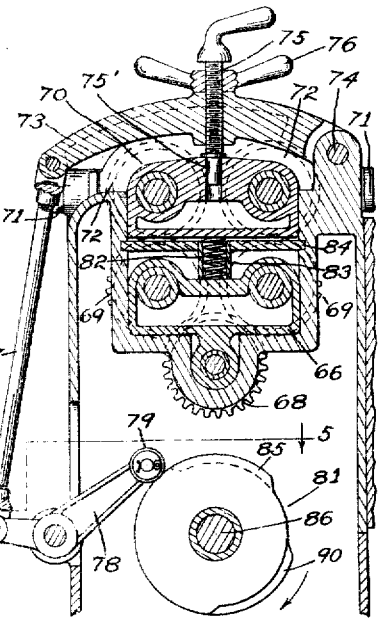
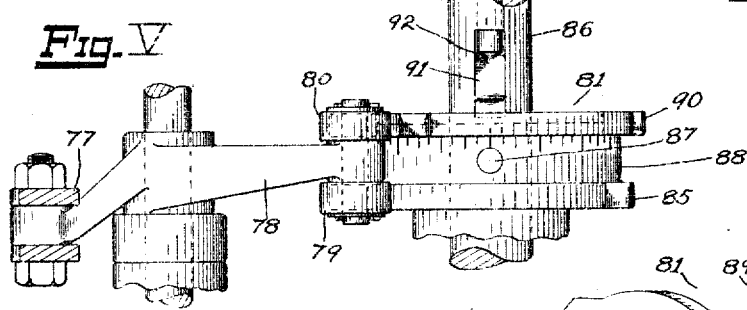
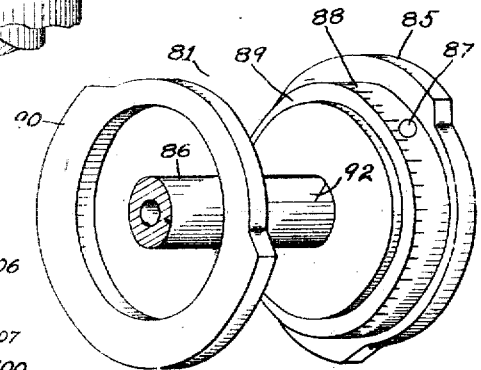
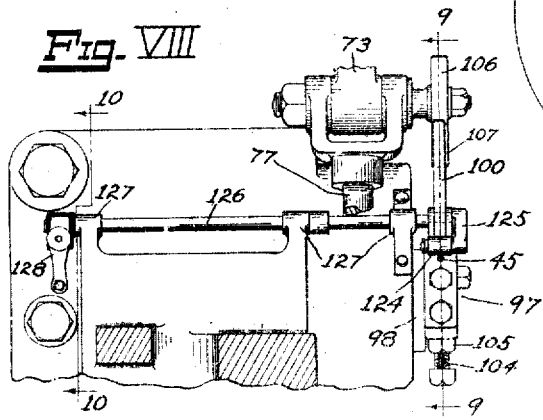
INVENTOR
Bert L. Van Orman
BY
Chappell & Earl
ATTORNEYS

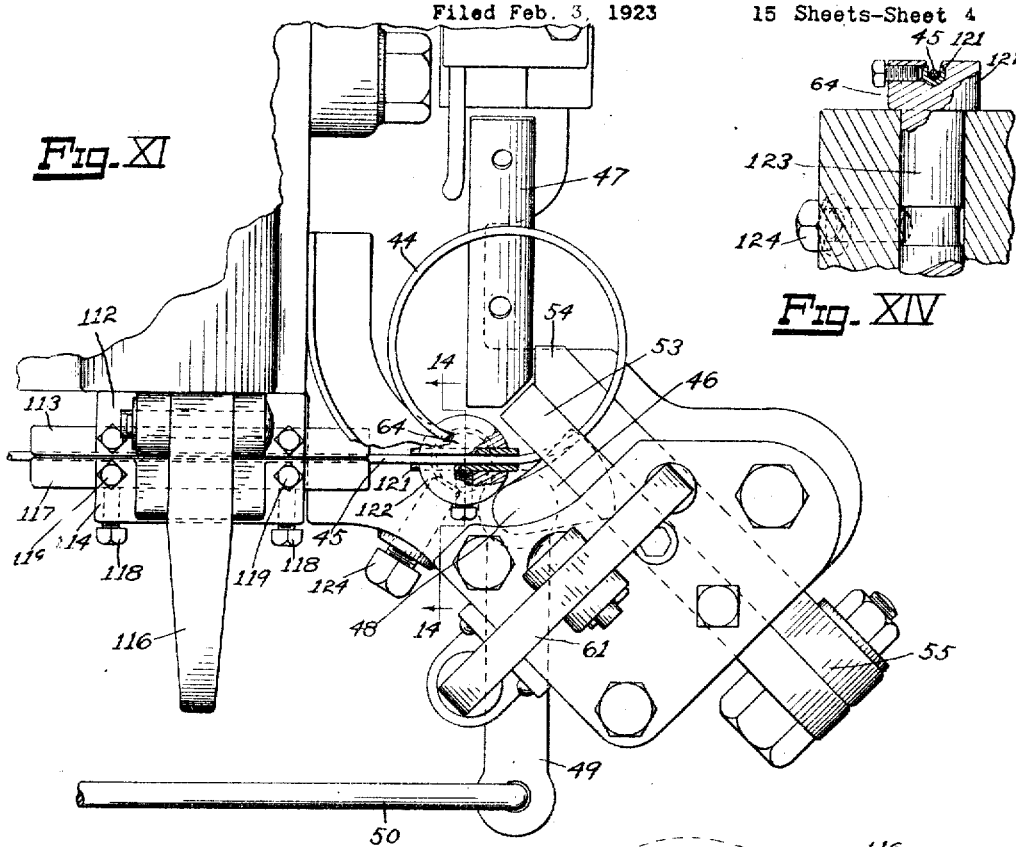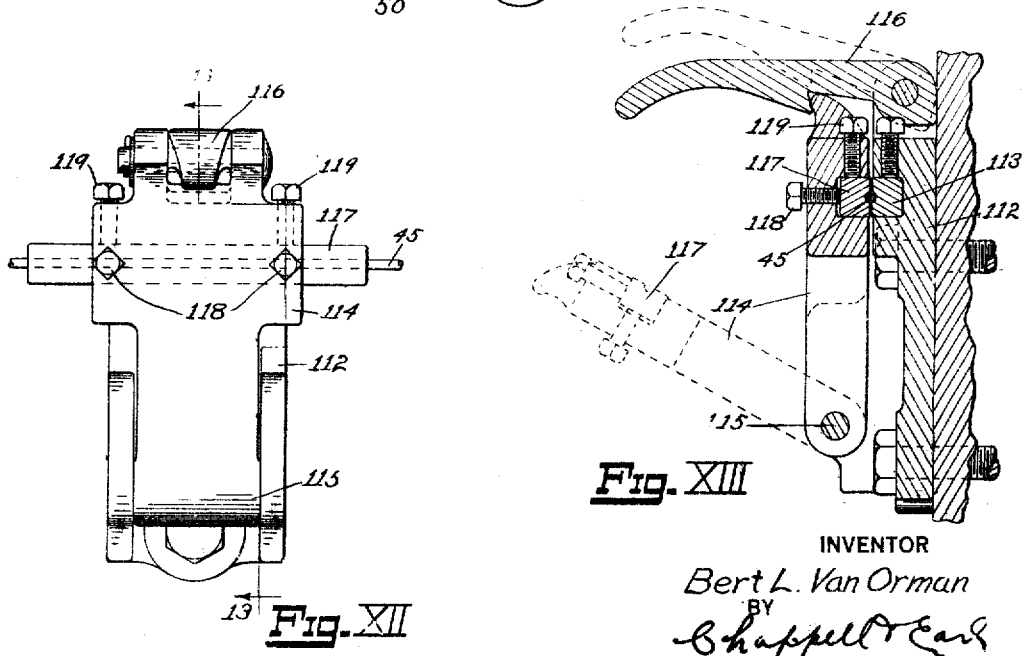

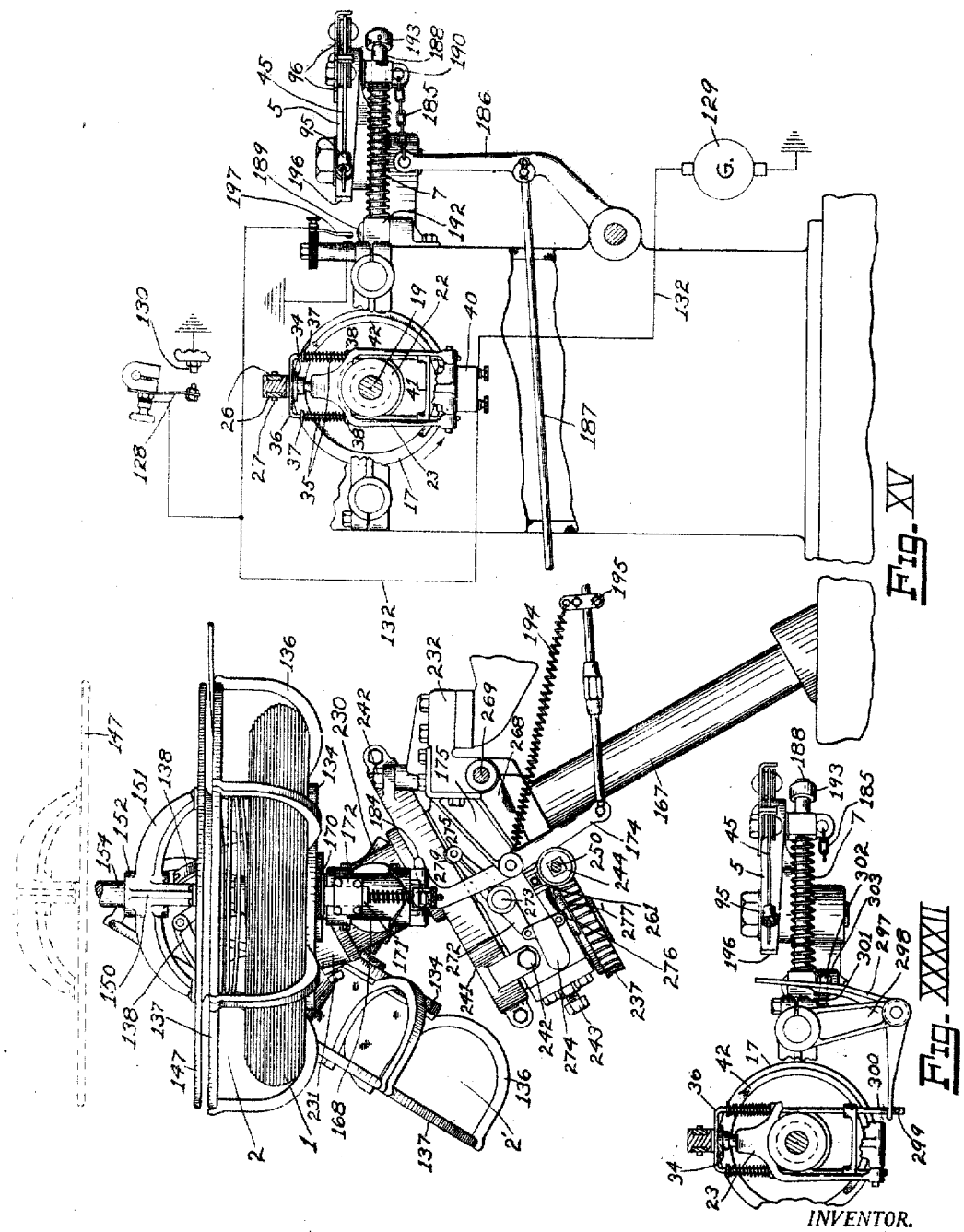

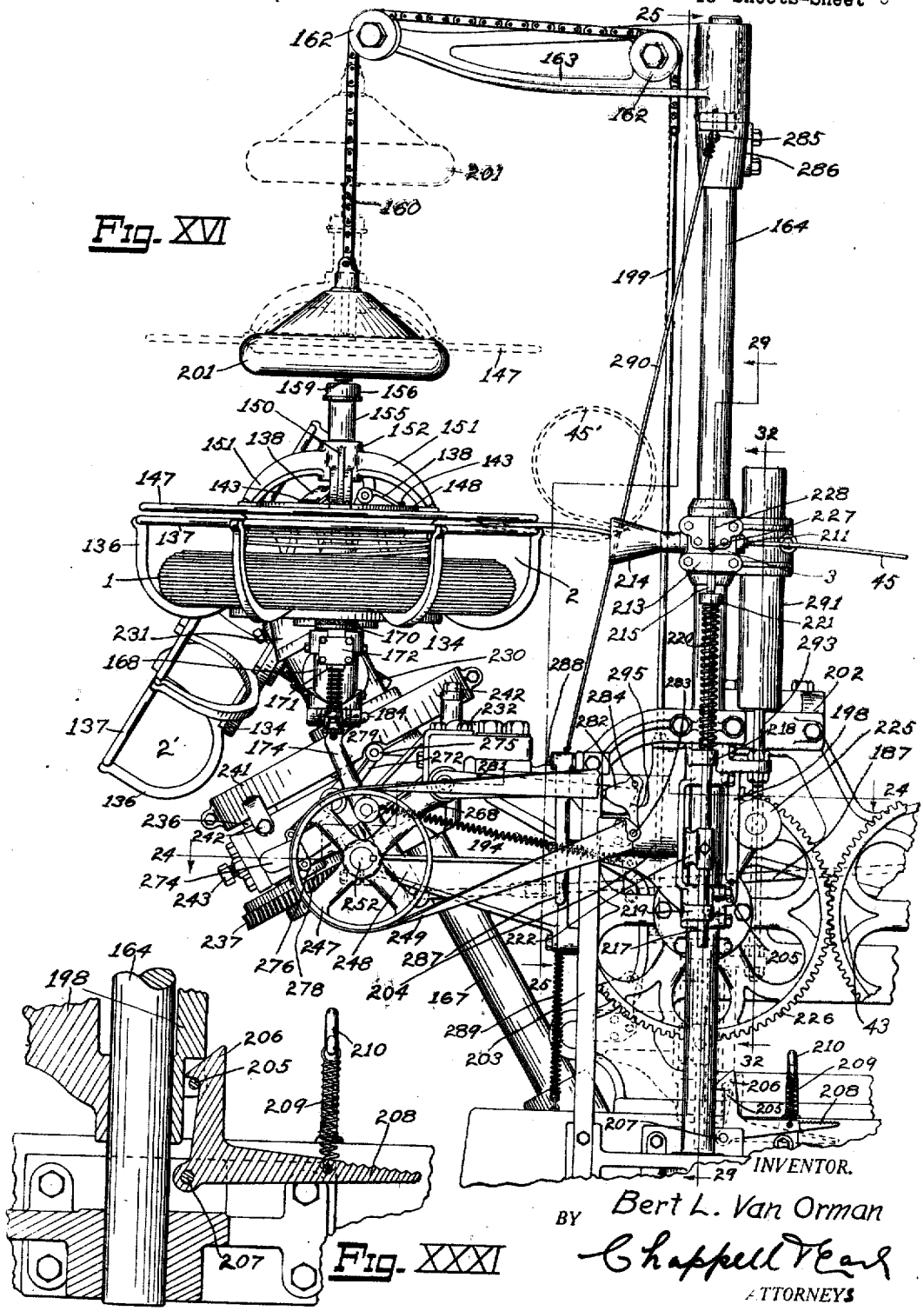

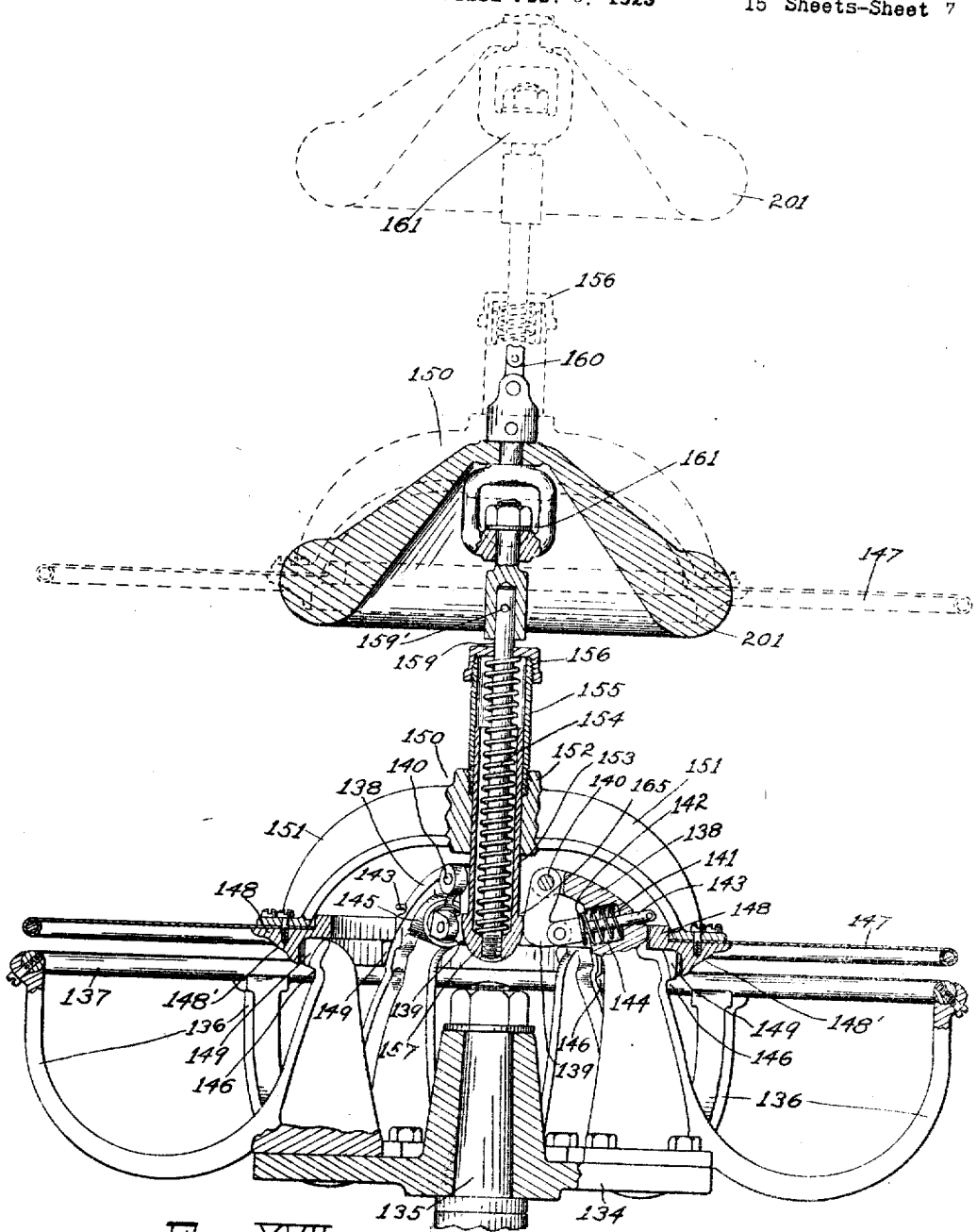

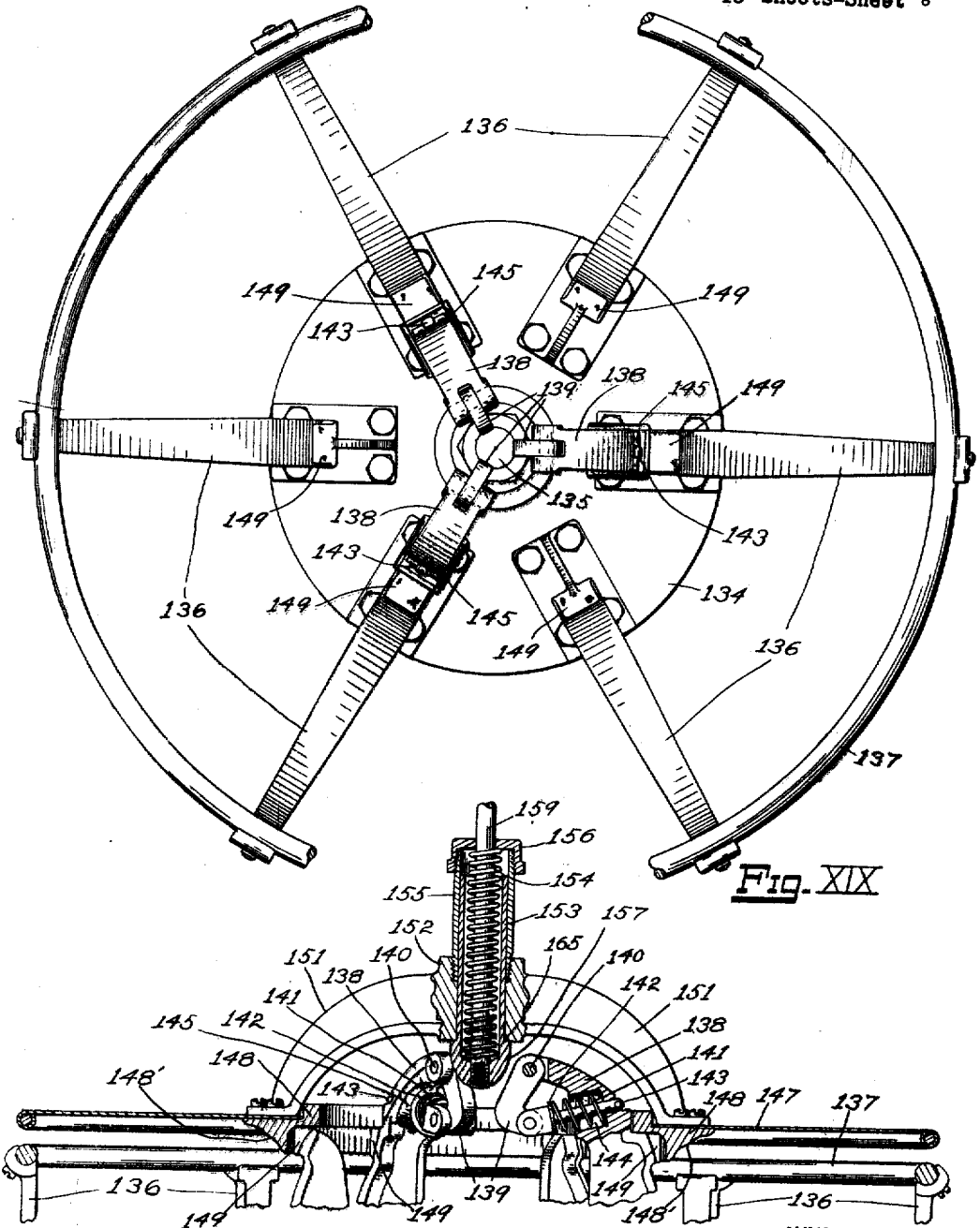

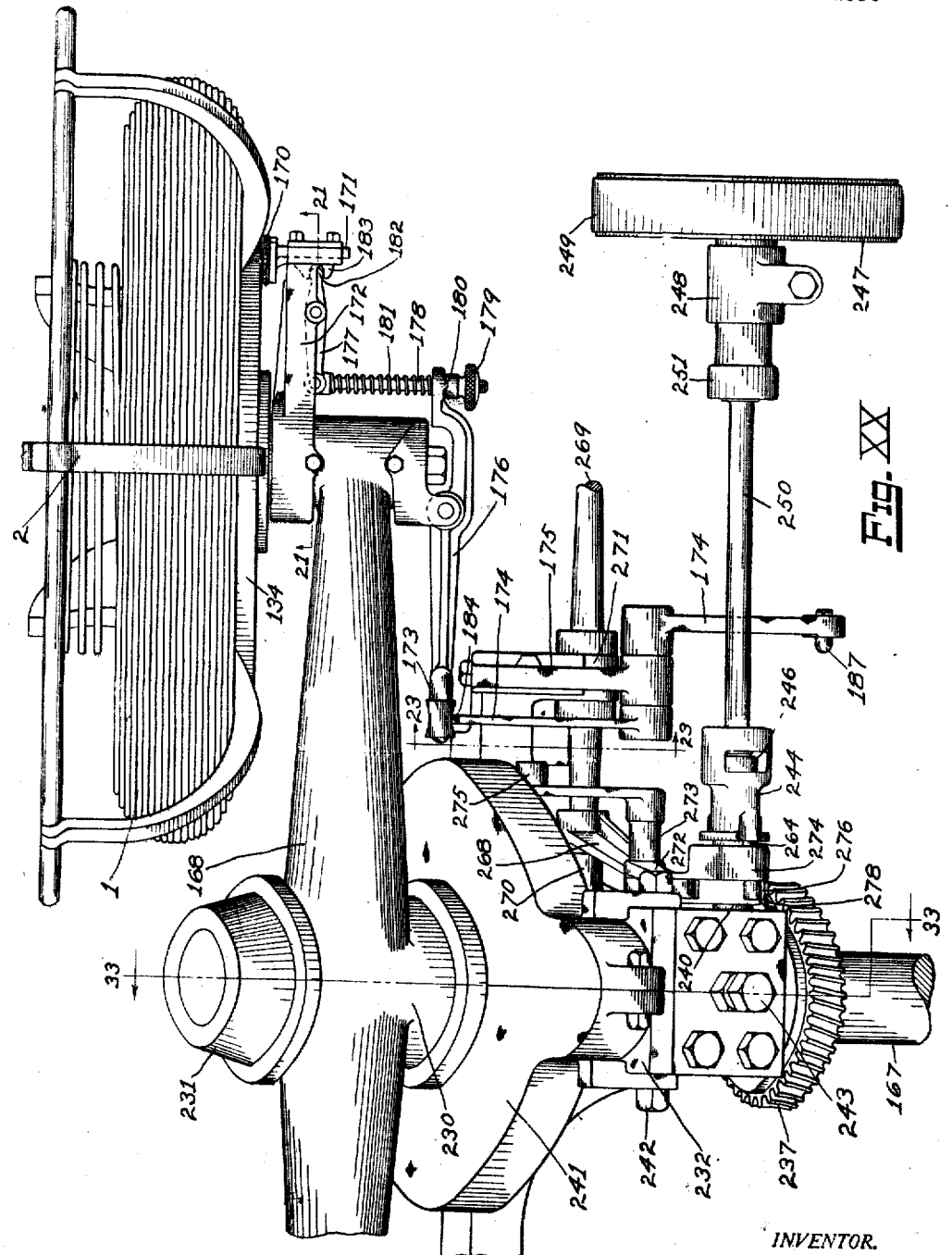

Sept. 9, 1924.  
B. L. VAN ORMAN  
1,507,871  
WIRE FEEDING MEANS FOR COILING, BENDING, OR OTHER WIRE FORMING MEANS  
Filed Feb. 3, 1923  15 Sheets-Sheet 10
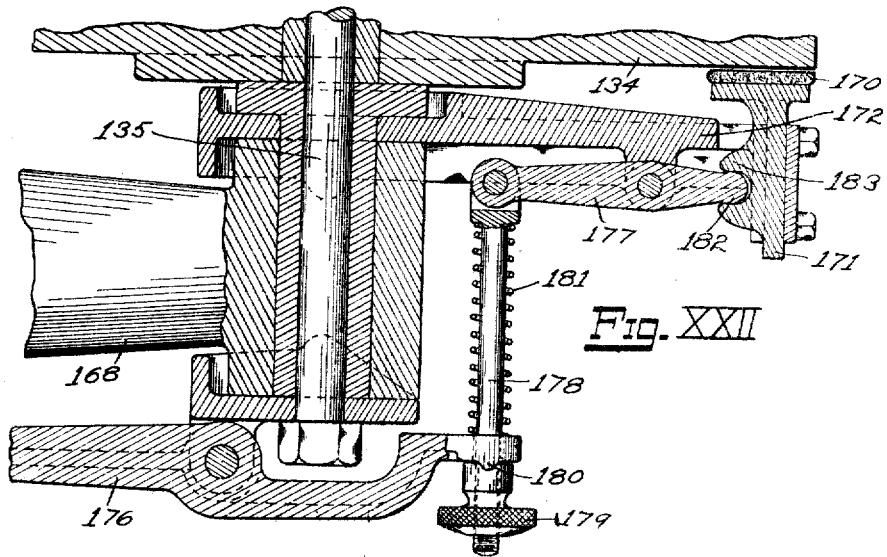
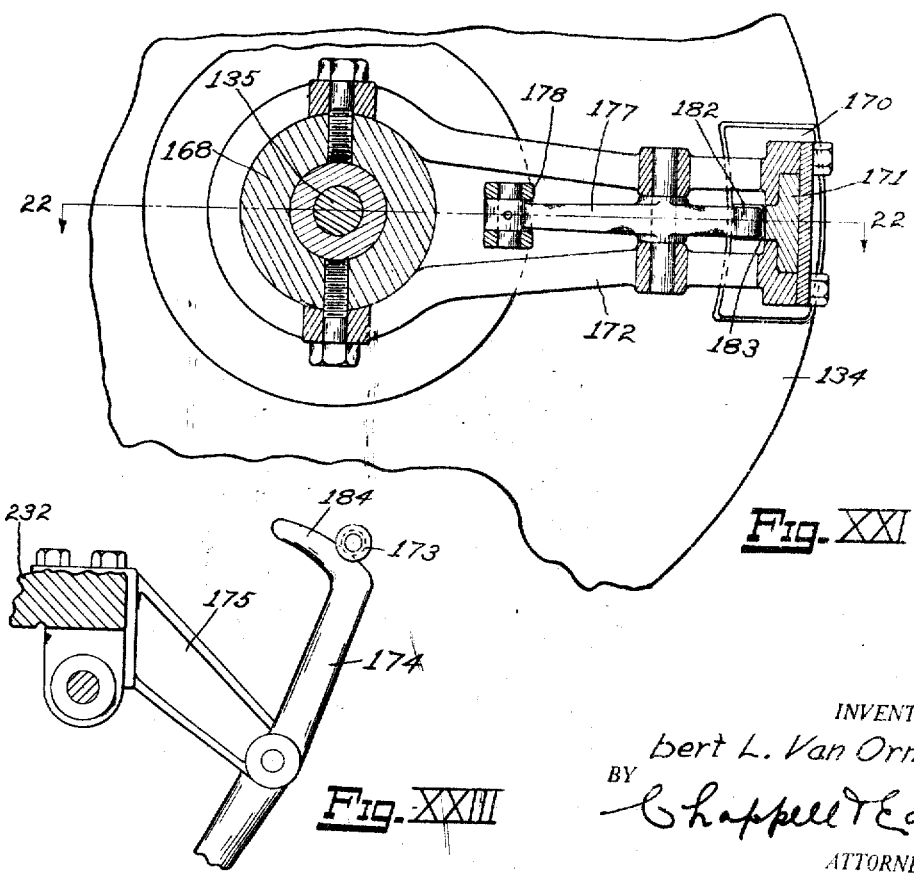
INVENTOR.  
Bert L. Van Orman  
BY  
Chappell & Earl  
ATTORNEYS

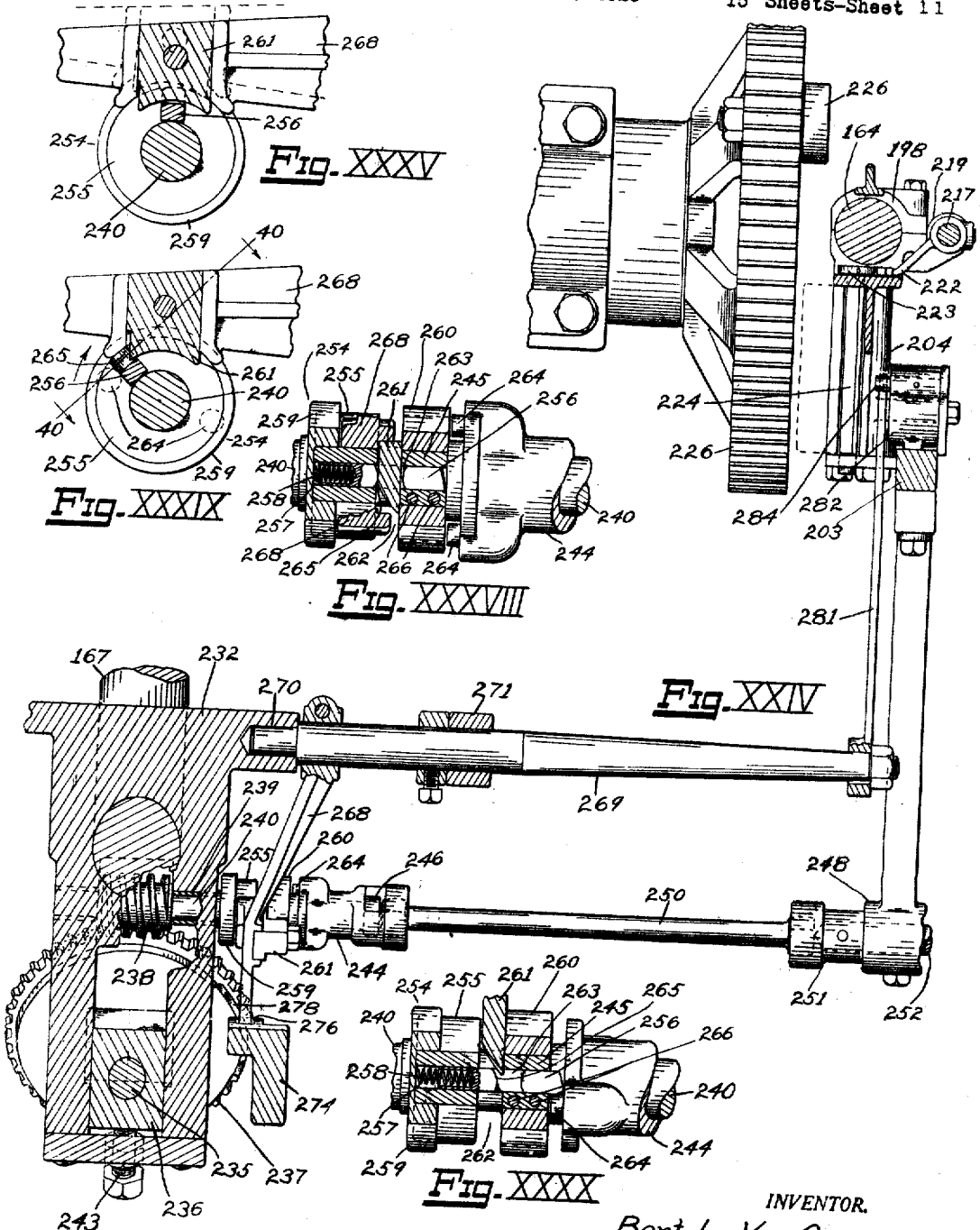

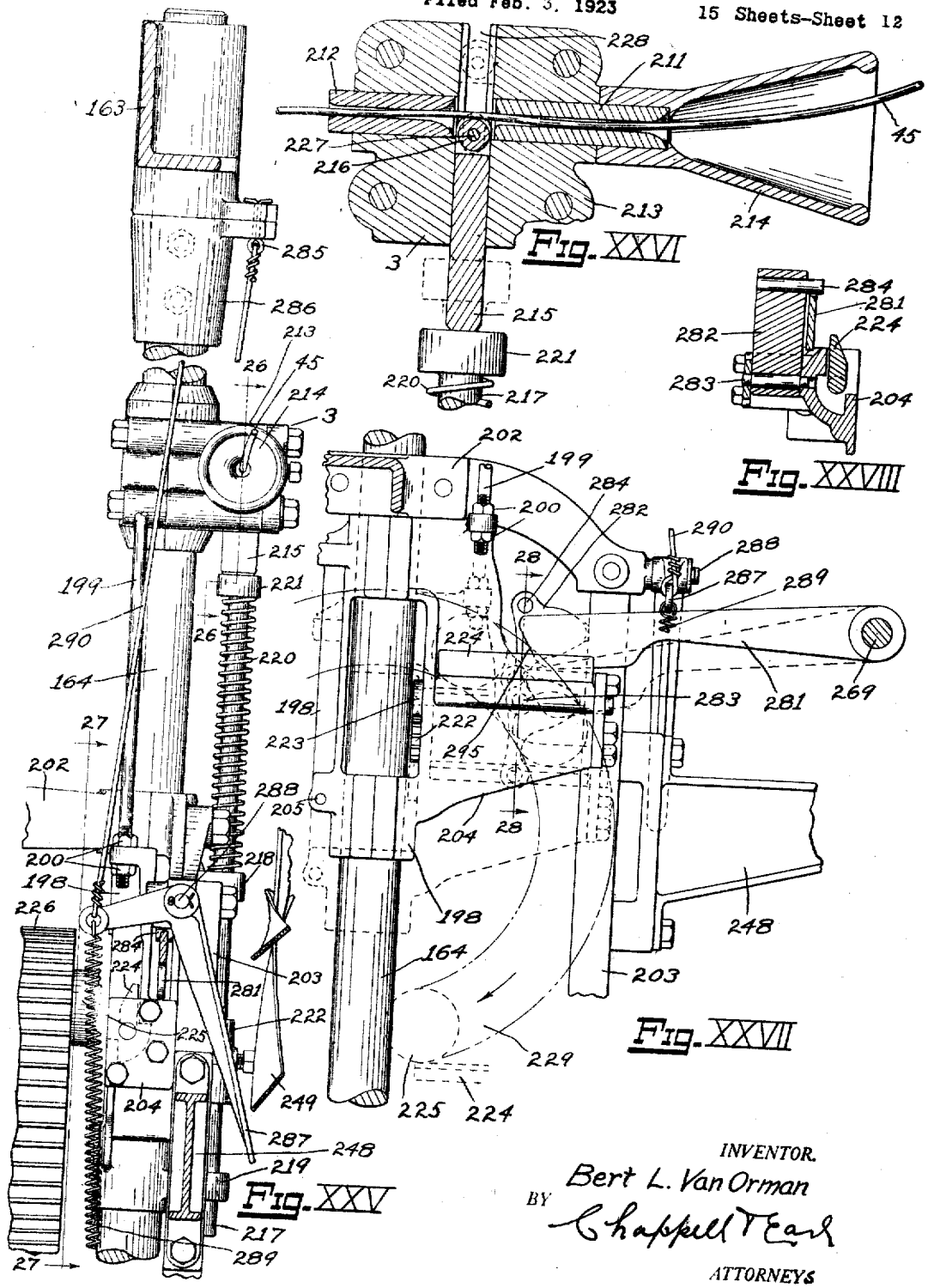

Sept. 9, 1924.
B. L. VAN ORMAN
1,507,871
WIRE FEEDING MEANS FOR COILING, BENDING, OR OTHER WIRE FORMING MEANS
Filed Feb. 3, 1923
15 Sheets-Sheet 13
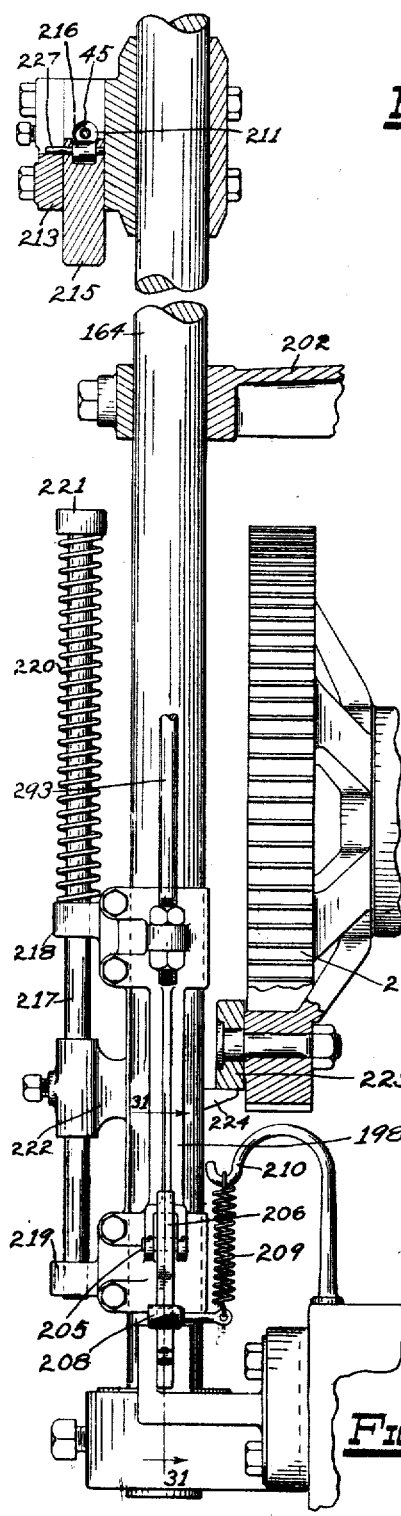
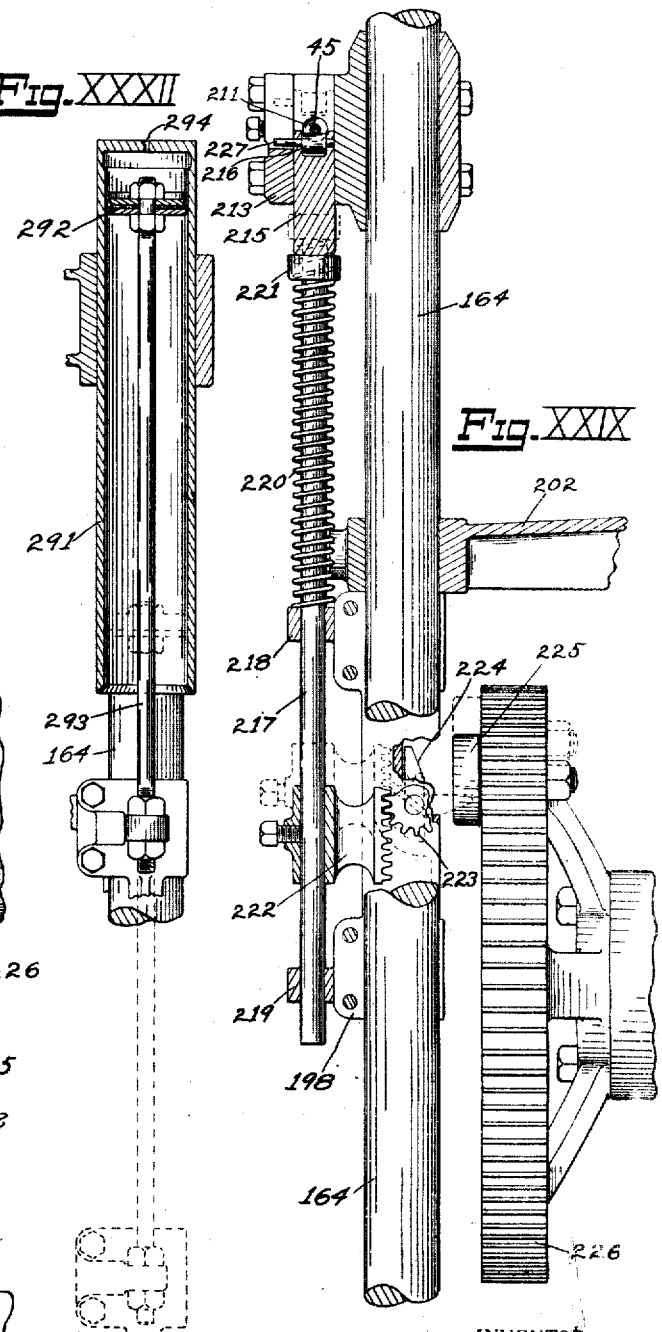
INVENTOR.
Bert L. Van Orman
BY
Chappell Earl
ATTORNEYS

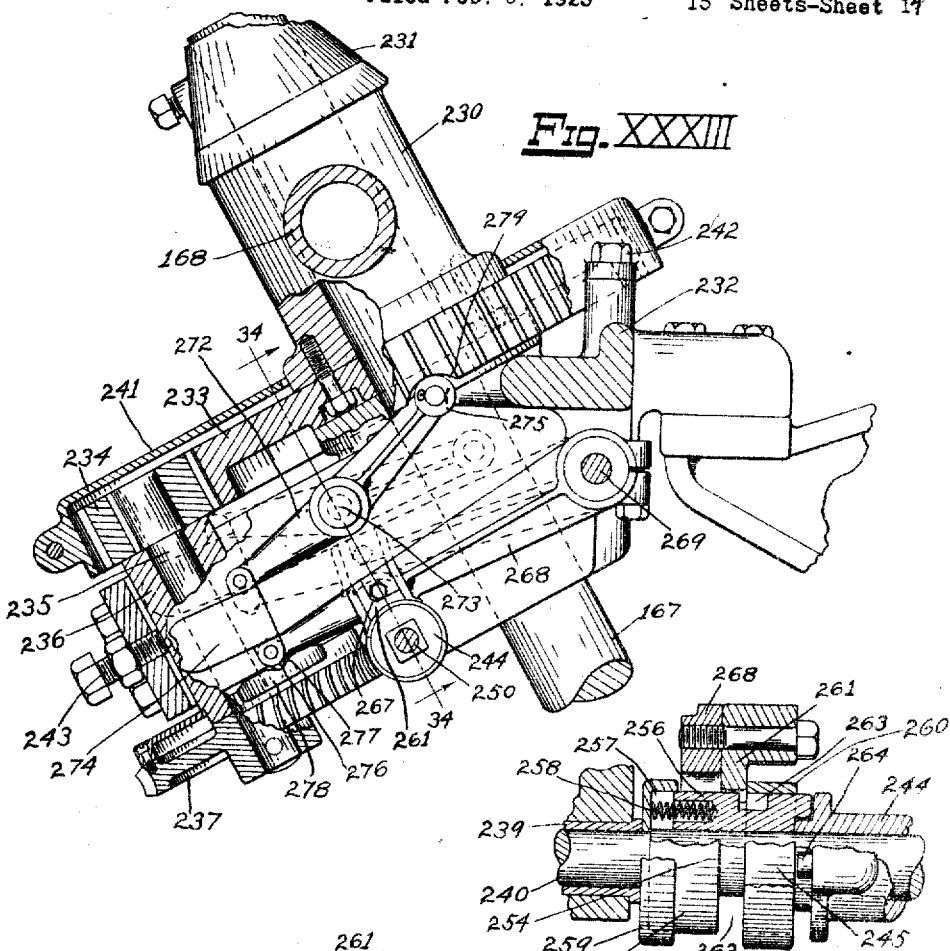

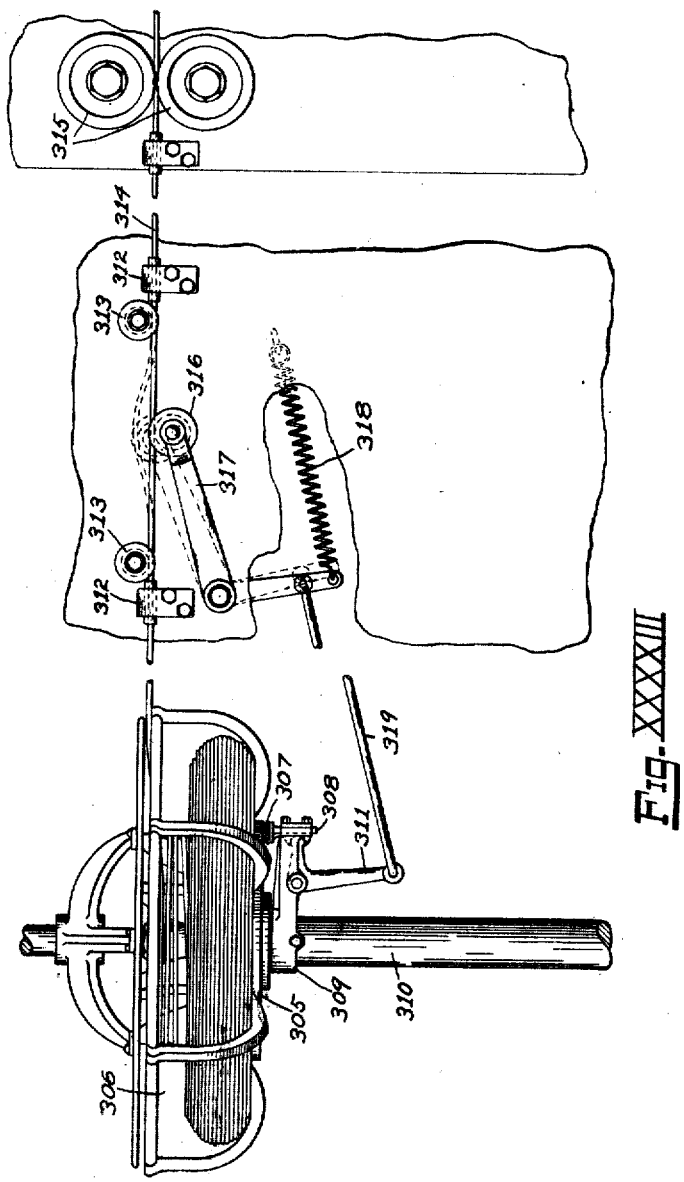

Patented Sept. 9, 1924.

1,507,871

UNITED STATES PATENT OFFICE.

BERT L. VAN ORMAN, OF DETROIT, MICHIGAN, ASSIGNOR TO L. A. YOUNG INDUSTRIES, INC., OF DETROIT, MICHIGAN.

WIRE-FEEDING MEANS FOR COILING, BENDING, OR OTHER WIRE-FORMING MEANS.

Application filed February 3, 1923. Serial No. 616,652.

*To all whom it may concern:*

Be it known that I, BERT L. VAN ORMAN, a citizen of the United States, residing at Detroit, county of Wayne, State of Michigan, have invented certain new and useful Improvements in Wire-Feeding Means for Coiling, Bending, or Other Wire-Forming Means, of which the following is a specification.

This invention relates to wire feeding means for coiling, bending or other wire forming means.

In my present embodiment I have shown my invention applied to a machine for the manufacture of coiled springs such as are used in vehicle and furniture seats, mattresses, and the like. The construction and operation of this machine is fully described in my co-pending applications Serial No. 474,899, filed June 2, 1921 and Serial No. 574,846, filed July 13, 1922.

The main objects of this invention are:

First, to provide means of supplying wire intermittently at regular predetermined intervals, to wire forming mechanism.

Second, to provide adjusting means whereby the amount of wire supplied during each cycle of operation may be regulated.

Third, to provide means of preventing backlash or retrograde movement of the wire during the idle period of the forming mechanism when the wire is released from the feeding means.

Fourth, to provide means of holding a stock bale or coil of wire in a manner appropriate to permit the bale to revolve and uncoil in accordance with the requirements of the forming mechanism, the coils of wire being confined during this operation.

Fifth, to define the course of the wire between the supply bale and the forming device.

Sixth, to govern the rotation of the stock bale to prevent excessive supply of wire, and to provide means of compensating for differences between the nearly constant rotation of the bale and the intermittent motion of the wire in the forming mechanism, thereby maintaining substantially an even tension in the wire.

Seventh, to provide means of automatically disconnecting the machine from its source of power when abnormal stress is placed upon the wire or when a bale of wire becomes exhausted.

Eighth, to minimize the amount of time and labor required to supply the forming mechanism with a fresh supply of wire upon the exhaustion of a bale; the means of accomplishing this result including power driven mechanism for bringing a bale of wire into operative position and means of automatically throwing the bale transferring mechanism into action when a bale is exhausted.

Ninth, to provide means of automatically disconnecting power from the bale transferring mechanism when any interruption in the operation of the latter occurs that might cause injury to the machine.

Tenth, to so construct the various parts that they will withstand considerable wear and continue in operation with a minimum amount of attention and to provide ease of adjustment and accessibility of parts.

Further objects and objects relating to construction are disclosed in the drawings forming a part of these specifications, in which:

Fig. I, Sheet 1, is a general plan view of a spring coiling machine embodying my invention.

Fig. II, Sheet 2, is a fragmentary view, partly in elevation and partly in section on a line corresponding to line 2—2 of Fig. I.

Fig. III, Sheet 3, is a detail view mainly in section on a line corresponding to line 3—3 of Fig. II, showing details of feeding rolls with driving and automatic controlling means therefor.

Fig. IV, Sheet 3, is a detail view mainly in section on a line corresponding to line 4—4 of Fig. III.

Fig. V, Sheet 3, is an enlarged fragmentary view partially in section on a line corresponding to line 5—5 of Fig. IV, showing details of the feed mechanism.

Fig. VI, Sheet 3, is a detail perspective view of the adjustable actuating cam in disassembled relation.

Fig. VII, Sheet 2, is an enlarged fragmentary view of a portion of Fig. II, illustrating details of wire feed controlling means.

Fig. VIII, Sheet 3, is a fragmentary view in section on a line corresponding to line 8—8 of Fig. VII, showing further details of controlling means.

Fig. IX, Sheet 2, is an enlarged detail view mainly in section on a line corresponding to line 9—9 of Fig. VIII.

Fig. X, Sheet 2, is a detail view in section on a line corresponding to line 10—10 of Fig. VIII, of an automatic circuit closing means actuated by the failure of wire supply.

Fig. XI, Sheet 4, is an enlarged fragmentary plan view of the wire coiling mechanism and wire guides.

Fig. XII, Sheet 4, is an enlarged detail view of one of the wire guides.

Fig. XIII, Sheet 4, is a detail section on a line corresponding to line 13—13 of Fig. XII.

Fig. XIV, Sheet 4, is a detail view of the final wire guide partially in section on a line corresponding to line 14—14 of Fig. XI.

Fig. XV, Sheet 5, is a fragmentary view partly in side elevation, partly in section and partly diagrammatic, showing the assembled relation of parts of wire feed governing mechanism.

Fig. XVI, Sheet 6, is a fragmentary elevation of wire bale holding reels, the reel governing means and mechanism for automatically changing the positions of the reels.

Fig. XVII, Sheet 7, is an enlarged fragmentary view partially in vertical section on a line corresponding to line 17—17 of Fig. I, illustrating details of the wire bale holding reels with automatic cover locking mechanism.

Fig. XVIII, Sheet 8, is a fragmentary view similar to Fig. XVII, but with the cover unlocked.

Fig. XIX, Sheet 8, is an enlarged detail plan view of a wire bale holding reel with cover removed.

Fig. XX, Sheet 9, is an enlarged fragmentary elevation, taken from the right of Fig. I, illustrating details of the reel braking mechanism and reel support.

Fig. XXI, Sheet 10, is an enlarged detail view of parts of the reel braking mechanism in horizontal section on a line corresponding to line 21—21 of Fig. XX.

Fig. XXII, Sheet 10, is a vertical section on a line corresponding to line 22—22 of Fig. XXI.

Fig. XXIII, Sheet 10, is a detail elevation of the brake actuating cam and roller, taken from a line corresponding to line 23—23 of Fig. XX.

Fig. XXIV, Sheet 11, is an enlarged detail view partially in section on a line corresponding to line 24—24 of Fig. XVI, showing further details of the mechanism for swinging the double reel holder and means of automatically throwing the swinging mechanism into action.

Fig. XXV, Sheet 12, is an enlarged fragmentary view partially in section on a line corresponding to line 25—25 of Fig. XVI.

Fig. XXVI, Sheet 12, is an enlarged detail view partially in section on a line corresponding to line 26—26 of Fig. XXV, showing details of the first wire guide.

Fig. XXVII, Sheet 12, is a detail view, partially diagrammatic and partially in section on a line corresponding to line 27—27 of Fig. XXV.

Fig. XXVIII, Sheet 12, is a detail vertical section on a line corresponding to line 28—28 of Fig. XXVII.

Fig. XXIX, Sheet 13, is an enlarged detail view partially in vertical section on a line corresponding to line 29—29 of Fig. XVI, illustrating means for automatically throwing the reel changing mechanism into action.

Fig. XXX, Sheet 13, is a view similar to Fig. XXIX, but with control parts in actuated position.

Fig. XXXI, Sheet 6, is an enlarged vertical section on a line corresponding to line 31—31 of Fig. XXX, showing details of a locking dog for holding parts in actuated position.

Fig. XXXII, Sheet 13, is an enlarged detail view of a pneumatic shock absorber, partially in section on a line corresponding to line 32—32 of Fig. XVI.

Fig. XXXIII, Sheet 14, is a fragmentary view in section on lines corresponding to lines 33—33 of Fig. XX, illustrating mechanism for rotating the reel holder.

Fig. XXXIV, Sheet 14, is an enlarged detail view partially in section on a line corresponding to line 34—34 of Fig. XXXIII, illustrating details of reel support driving mechanism.

Fig. XXXV, Sheet 11, is a detail section on a line corresponding to line 35—35 of Fig. XXXIV.

Fig. XXXVI, Sheet 14, is a view similar to Fig. XXXIV, with a clutch dog in engaging position.

Fig. XXXVII, Sheet 14, is a detail section on a line corresponding to line 37—37 of Fig. XXXIV.

Fig. XXXVIII, Sheet 11, is a detail view in section on line 38—38 of Fig. XXXVII, showing the clutch dog in released position.

Fig. XXXIX, Sheet 11, is a detail view similar to Fig. XXXV with parts in another position.

Fig. XXXX, Sheet 11, is a detail view in section on a line corresponding to line 40—40 of Fig. XXXIX.

Fig. XXXXI, Sheet 14, is a detail view of a universal coupling employed in section on a line corresponding to line 41—41 of Fig. XXXIV.

Fig. XXXXII, Sheet 5, is a modification of parts shown in Fig. XV, illustrating mechanical means of automatically stopping the machine.

Fig. XXXXIII, Sheet 15, is a conventionalized view showing a modified form of wire feed governor.

In the drawing similar reference characters refer to similar parts throughout the several views and the sectional views are taken looking in the direction of the little arrows at the ends of the sectional lines.

Referring to the drawing, the operation of the machine which as stated, is adapted for the making of coiled springs for use in upholstery, mattresses and the like, is in general as follows:

The wire is drawn from a stock bale 1, carried by a reel 2 (see Fig. I), through suitable guides 3 and 4 to a tension arm 5 which is pivoted at 6 and yieldingly supported by means of the coil spring 7. From the tension arm, the wire passes to the feed rollers 8 by which it is driven to the coiling mechanism designated generally by the numeral 9. After coiling, the spring is carried to the first knotter designated generally by the numeral 10, by means of a reciprocating arm 11. This first knotter forms the bottom knot of the spring which is then transferred by the swinging transfer arm 12 to the gauging and positioning device designated generally by the numeral 13. The spring is transferred from this positioning and gauging device to the second knotter, designated generally by the numeral 14, by the transfer arm 15, which inverts the spring during its transfer, bringing the other end into co-acting relation to the second knotter. After the operation of this knotter 14 on the spring, the spring is ejected from the machine by means of a rotating ejector 16. Operation of the knotter and transferring means is shown and described in detail in my applications for Letters Patent hereinbefore referred to.

The several mechanisms being illustrated and their operating means and connections being described in these applications, I deem it unnecessary to illustrate and describe such details herein further than they have directly to do with my present invention.

Power from any suitable source is received by a pulley 17 which is arranged to be operatively connected to a driven gear 18 by suitable transmission enclosed within the pulley. Since the construction and operation of this power transmitting means is described in detail in my co-pending application, Serial No. 595,995, filed Oct. 21, 1922, I deem it sufficient in my present embodiment to give a general description and to illustrate and describe means of controlling the change speed mechanism.

A driven shaft 19 which carries the driven gear 18 (see Fig. III) extends through the mechanism and a supporting bearing 20, and carries a hand wheel 21 on its outer end. By means of the wheel 21, the machine may be slowly turned over by hand in setting up and making adjustments. The driven shaft 19 forms a support for the gears and clutches which constitute the change speed transmission. A cone 22 reciprocatably mounted on the shaft 19 may be moved by a yoke 23 into or out of engagement with rollers 24 carried by levers 25 which are so arranged as to be capable of causing frictional engagement between the driving and the driven parts. When the yoke 23 is moved inwardly, the levers are expanded, thereby frictionally locking all of the transmission parts together as a unit and causing the driven gear 18 to rotate at the same speed of the driving pulley 17. Movement of the cone 22 outwardly a suitable distance releases the frictional engagement of the parts and allows the driving members to revolve idly while the driven shaft 19 and gear 18 remain stationary. Movement of the yoke 23 and cone 22 may be controlled by a slide bar 26 reciprocatably mounted above the transmission and operatively connected to the yoke 23 by a pin 27 engaging openings in the sides of the bar 26. The bar 26 is manually actuated by a hand lever 28 pivoted at 29 and connected with the bar 26 by a link 30. After the yoke 23 has been moved far enough to neutralize the transmission, continued outward movement of the bar 26 contracts brake shoes 31 upon a suitable drum 32 thereby holding certain gears stationary and causing the driven gear 18 to be rotated at half the speed of the pulley 17.

In Figs. I, III, and XV are illustrated means of automatically throwing out the yoke 23 to neutralize the transmission and stop the machine. A roller 34, reciprocatably mounted upon the upwardly extending portion of the yoke 23, is normally held to its upward limit by springs 35 which are carried by a yoke 36 and are in compression between the collars 37 and bosses 38 on the shifting yoke 23. The yoke 36 has a horizontal upper portion engaging a groove in the roller 34 and downwardly extending arms reciprocatable in guides 39 in the cone shifting yoke 23. An electro-magnet 40 is mounted on a stationary part of the machine in operative relation to an armature 41 carried by the yoke 36. When the electro-magnet is energized by passage of an electrical current through it, the yoke 36 is caused to pull the roller 34 downward and into range of a face cam 42 carried by the pulley 17. If this action occurs while the yoke 23 is in a position to hold the transmission in high speed, the yoke 23 is thrown into neutral position by the cam 42 within the first revolution of the pulley, thereby immediately disconnecting power from the machine. This automatic stopping device is a valuable safety measure which may be brought into action to stop the machine whenever certain abnormal conditions arise that might cause injury to the machine.

The driven gear 18 is operatively connected to a train of gears, indicated generally by the numeral 43, which cause motion of the various parts of the machine in correctly timed relation to operate the machine properly.

The coiling of wire into a spring of substantially the form shown at 44 in Fig. II is accomplished by projecting the wire 45 against a coiler block 46 (see Fig. XI) which co-operates with a spreader bar 47. The coiler block 46 is oscillated about a center 48 by a rock arm 49 which is actuated through a connecting link 50 by a cam lever 51 and cam 52. In forming the coil, the wire 45 under-runs a fixed bar 53 and over-runs a cutter bar 54, which is pivoted at 55 and adapted to be swung upwardly across the shearing face of the bar 53 by tappets 56 and 57 which are projected upward by a lever 58 pivoted at 59 and actuated by a cam 60 (see Fig. II). Return movement of the cutting bar is effected by pressure from a rock lever 61 actuated by a compression spring 62. This cutting device acts to sever each formed spring from the unformed stock.

After each spring is formed, it is desirable that the movement of the wire be stopped for a period of time sufficient to allow the coiled spring to be severed and removed from the coiling mechanism. This requires an intermittent wire feeding action which is accomplished by the following means: Wire is pulled from the supply bundle 2 and forced through guides 63 and 64 (see Figs. II and III) to the coiling mechanism by the feed rollers 8 consisting of lower rollers 8$^a$ and upper rollers 8$^b$. The rollers all revolve at the same speed, the wire being forced along by frictional engagement with suitable grooves 65 formed in the peripheries of the rollers. The lower rollers 8$^a$ are journaled in a stationary bearing member 66 mounted in the main frame of the machine and adapted to receive motion from the driven gear 18 through suitable gears 67, 68 and 69 (see Figs. III and IV). The upper rollers 8$^b$ are carried by a bearing member 70 which is pivoted to the main frame by pins 71. By rocking the bearing member 70 on the pivots 71, the upper rollers may be lifted out of feeding engagement with the wire whenever it is desired to stop the feeding of wire to the coiler. The upper rollers are driven through gears 72 which are in mesh with the gears 69 of the lower rollers. The amount of lift required to release the feed on the wire is so slight that the gears 72 are not lifted out of proper driving relation with the gears 69 far enough to affect the rotation of the rollers 8$^b$ which are running idle during this interval. The bearings are so spaced as to bring the gears into correct mesh while the feed rollers are at work. The upper rollers 8$^b$ are held in operative relation with the lower rollers during their working period by a clamping lever 73 pivoted to the main frame at 74 and exerting pressure upon the bearing member 70 through an adjusting screw 75 which is locked in set position by a hand wheel or lock nut 76. A removable bearing surface, as for instance, the hardened pin 75' is preferably interposed between the adjusting screw and the bearing member 70. The clamping lever 73 is connected by an adjustable link 77 to a cam lever 78 which carries rollers 79 and 80, engaging a cam indicated in general by the numeral 81 (see Figs. IV, V and VI). A spring 82 which is held in position by a cylindrical keeper 83 supported by a bar 84, is in compression between the lower bearing member 66 and the upper bearing member 70. Whenever pressure from the clamping lever is released, expansion of the spring 82 lifts the upper feed rollers out of operative engagement with the lower rollers. This arrangement enables the cam 81 to control the amount of wire used in the coil and to time the movement of wire in correct relation to the action of the coiler parts.

In order to avoid the necessity of providing a separate cam for each type of spring manufactured by the machine, I have designed the feed control cam 81 in such a way that the length of dwell may be varied to meet any feeding requirements. As embodied herein this cam 81 consists of two spaced cam members 85 and 90 (see Figs. III, IV, V and VI) each cam member operatively engaging one of the rollers carried by the lever 78. The cam member 85 is fixed to a drive shaft 86 as by the pin 87, and has a collar portion 88 with a shoulder 89 formed to receive the other ring like cam member 90. The cam member 90 is held in frictional engagement with its companion cam member 85 by a clamping block 91 resting in a slot 92 in the shaft 86, the clamping block being pressed against the cam by a set screw 93 and interposed rod 94 lying in an axial bore of the shaft 86. By loosening the set screw the cam member 90 may be turned to any position relative to the fixed cam member 85. Since the cam lever 78 is held in actuated position whenever either of its rollers 79 or 80 is in contact with a working portion of the corresponding cam member, the feed rollers 8 are held in operative engagement from the time that the lever 78 is actuated by one cam member until it is released by the other cam member. For instance, the feeding of wire to the coiler begins when cam member 85 first engages roller 79 and stops when member 90 goes out of engagement with roller 80. By shifting one member in relation to the other, the cam 81 may be set to meet the feeding requirements of any type of spring that the coiler can form. It is desirable to mark the member 88 with a graduated scale (see Figs. V and VI) and the adjacent surface of member 90 with a line to serve as a guide when making adjustment.

The action of the feed rollers 8 draws the wire from the reel through the guides 3 and 4, guide bushing 95 and over rollers 96, carried by the tension arm 5, and around a guide roller 96' to an arresting device 97 supported by the guide member 98. The arresting device (see Figs. II, VII, VIII, IX) prevents backlash or retrograde movement of the wire 45 during the interval of time that wire is released by the feed rollers 8. The device consists of a bracket 97' supporting suitable guide members 99 through which the wire passes. A bell crank clutch lever 100 pivoted at 101 in the bracket 97' is so disposed as to be forced by a compression spring 102 against the wire at such an angle that the wire is firmly gripped or clutched between the clutch lever and the upper end of a relatively fixed clutch block 103 which is adjustably supported by a set screw 104 and lock nut 105. Whenever the feed actuating lever 73 is pulled downward to bring the feed rollers 8 into action, a tappet 106 adjustably mounted upon the lever and having an inclined edge 107, engages the upper end of the clutch lever 100 and forces the lower end against the action of the spring 102 thereby releasing the hold on the wire 45 (see dotted outline in Fig. IX). Since the gripping action of this arresting device is controlled by movement of the feed actuating lever 73, the wire is free to pass through the guides whenever the feed rollers 8 are in action, but is held firmly by the clutch whenever released by the feed rollers. The clutch lever 100 is shown as being constructed with duplicate end portions in order that it may be inverted to present a new surface to the wire when one end has become worn.

The wire is supported and guided between the pairs of feed rollers by a guide consisting of bushings 109 carried by a suitable bracket 110. Upon leaving the last pair of feed rollers, the wire passes through the guide member 63 (see Figs. XII and XIII) which is especially designed for accessibility and consists of a stationary block 112, carrying a hardened insert 113, and a movable section 114 which is pivoted at 115 and clamped into closed position by a suitable lever 116. The pivoted section 114 also holds a hardened insert 117, the position of which is adjustable by means of adjusting screws 118 and set screws 119. By swinging the movable section 114 to open position (see dotted outline in Fig. XIII) ready access may be had for inspection, for initially entering the wire and for removing the short piece of wire left after exhaustion of the supply.

The final guide 64 (see Fig. XIV) consists of a bushing 121 adjustably secured in the head 122 of a stud 123 which is rotatably adjustable in the main frame, being held in position by a set screw 124. Accurate adjustment of this guide is essential as the guide bears the reaction from the pressure of the coiler block and cooperates with the latter when coiling springs. As an adjunct to the accessible feature of the guide member 63, the bushing 121 of the guide member 64 is preferably left open on top so that when the supply of wire becomes exhausted the guide member 63 may be opened and the wire readily removed from both final guides. Since the guide member 63 supports the wire to a point near the guide 64 and upon leaving the latter, the wire passes underneath the upper cutting bar 53, there is no tendency for the wire to leave the bushing 121 during the coiling process.

When the supply of wire becomes exhausted, the machine is stopped by the following means:

A roller 124 is carried by a rock arm 125 secured to a shaft 126 journaled in bearings 127 on the main frame (see Fig. VII). An electrical contact member 128 also secured to the shaft 126 in insulated relation thereto (see Fig. X) is in circuit with a generator 129 or other source of current and the electro-magnet 40 of the automatic stopping mechanism (see Fig. XV). The roller 124 rests upon the wire 45 at a point near the feed rollers 8 so that the wire normally holds up the rock arm 125 and likewise holds the contact 128 away from the ground contact 130 (see Figs. II, VII, VIII and X). Exhaustion of the wire allows the roller 124 to fall and the member 128 to ground on the contact 130 thereby completing the electrical circuit 132 and causing the electro-magnet to be energized and the machine to be stopped.

The reel 2 which carries the stock bale 1 for delivery of wire to the coiler or other forming means consists of a circular base plate 134, (see Figs. XVII, XVIII, XIX) which is rotatable on a spindle 135 and to which is attached a series of radially disposed supporting arms 136. These supporting arms are downwardly curved so that an irregular bale or coil of wire may rest and center itself therein in relation to the axis of rotation. The outer ends of the arms 136 are connected by a ring 137 which is preferably round in section or at least has a rounded inner surface over which wire may be led, without undue friction. Certain of the supporting arms 136 have an inwardly projecting upper arm 138 which is curved to overhang the central portion of the base plate 134. A locking knuckle 139 is pivoted at 140 to each arm 138 and is held normally inward by a spring 141 in compression between a collar 142 on the keeper or locking pin 143, pivoted to the knuckle 139, and the inner face of a recess 144 formed in a boss 145 on the arm 138.

The cover plate 147 is supported when closed with its outer edge in spaced relation to the rim of the bale holder. The cover plate is carried by a spider 150 having radial arms 151 carrying or provided with a ring 148 to which the cover plate is secured. This ring 148 is adapted to rest on the lugs 149 on the supporting arms 136 when the cover plate is in its lowered or closed position. The hub 152 of the supporting spider 150 is aligned with the spindle 135. A tubular locking pin actuating member 153 is vertically reciprocatable in the hub 152 against the compression of a spring 154 arranged within the latch member. A cylindrical guide 155 secured in the hub 152 is provided for the upper portion of the member 153 and has a cap 156 which takes the thrust from the spring 154. When the cover is in closed position, the actuating member 153 is projected downward by the spring 154 and the spherical head 157 on its lower end forces the knuckles 139 outward so that the locking pins 143 project above the inner ring 148 of the cover plate thereby locking the latter in closed position (see Fig. XVII). A spindle 159, secured to the actuating member 153, serves as a keeper for the spring 154 and extends upward through an opening in the cap 156. The spindle is attached to a flexible cable 160 or other suitable supporting means by a swivel connection 161 which permits the reel and cover assembly to rotate on the bearing spindle 135 while the cable 160 remains substantially stationary. The cable 160 passes over sheaves 162 which are mounted on an overhanging arm 163 supported by the upright post 164 and provides means of lifting the cover from the reel (see Figs. XVI and XVII).

An upward pull on the cable 160 at first lifts the locking pin actuating member 152 out of engagement with the knuckles 139 allowing the springs 141 to retract the locking pins 143, freeing the cover, (see Fig. XVIII). After releasing the cover locking mechanism, the member 153 slides upward in the spider until the shoulder 165 engages the hub 152. Continued upward movement lifts the cover from the reel. The cover rests upon the shoulder 165 until let down into position to be supported by the lugs 149 on the reel arms 136. Continued downward movement causes the latter to engage the locking knuckles 139. The spindle 159 is secured to the swivel connection 161 by a shear pin 159′ to provide against possible breakage of other parts in case the cover 147 should fail to become released from the reel when the chain 160 is pulled.

When wire is drawn from a bale or coil of wire supported by the reel, the bale and reel assembly revolve on the spindle 135 to allow the wire to uncoil. The cover prevents any loose coils from getting away while the space between the ring 137 and the outer margin of the cover plate 147 permits ready withdrawal of wire from the reel.

Since the rim 137 over which the wire must pass is at a higher level than the bale 1, several coils are lifted above the bale before tension in the wire becomes great enough to rotate the reel. The upward movement of the coils is limited by contact with a ledge 146 in each of the arms 136, these ledges preventing the coils from working up above lugs 149 where possibly the wire would become lodged between the cover and the reel. Coils continue to rise from the bale to replace the wire drawn from the reel, the first few coils being wrapped tightly about the inner portions of the arms 136 whenever the wire is under tension. If the rate of rotation of the reel exceeds the requirements of the coiler 9, some of the coils are loosened and may be thrown up against the cover 147. When the coils again tighten about the arms 136, they are guided down below the shoulders 146 by the sloping or tapered surface 148′ of the ring 148.

For the purpose of minimizing the amount of time and labor required to replenish the supply of wire when a bale of wire becomes exhausted, I provide two reels, one being in a position to be easily loaded while the other is in operative position. An obliquely disposed standard 167 (see Figs. I, XV and XVI) supports a rotatable arm or carrier 168 on the ends of which the spindles 135 of the reels 2 and 2′′′ are mounted. The spindles 135 are so disposed in oblique relation to each other and to the standard 167 that the empty reel 2′, for instance, is in a tilted position while the axis of the other reel 2 is vertical. There is ample time to load the empty reel while its companion reel is in operation, the tilted position of the idle reel, making the work of placing a bale thereon comparatively easy. When reel 2 has exhausted its supply of wire, the cover 147 is lifted high enough to clear the reels and the carrier 168 rotated through substantially 180 degrees to reverse the respective positions of the reels so that reel 2 is in loading position and the reloaded reel 2' is in operative position.

As the reel revolves the inertia tends to rotate it at a constant and uniform rate of speed while the operation of the coiling mechanism requires intermittent feeding of wire as I have described. There is a tendency for the reel to continue to revolve during the idle intervals thereby causing the wire to be delivered in excess of the demands of the coiler. To compensate for this, I have provided the following means of governing the rotation of the reel:

Each reel is provided with a brake shoe 170 of suitable material which may be forced against the lower surface of the base plate 134 by reciprocation of a brake spindle 171 in an appropriate guide in a bracket 172 which is mounted on the outer end of the carrier 168. This movement of the brake spindle 171 is caused by the shifting of a roller 173 whenever the latter is lifted by the movement of a bell crank lever or cam 174 which is pivoted to a bracket 175 mounted on the main frame of the machine. The movement of the roller 173 is transmitted to the spindle 171 by any suitable means, as for example, the levers 176 and 177 connected by the link 178, one end of which is pivoted to the lever 177 while the other end passes through a guide opening in an end portion of the lever 176. The length of the link 178 may be regulated by a thumb nut 179 which is formed to engage a locking lug 180 on the lever 176, the parts being held in contact by a compression spring 181 on the link. As a further matter of good mechanical construction, the rounded end 182 of the lever 177 rocks in a recess formed by a suitably fashioned lug 183 on the brake spindle 171.

The bell crank lever 174 is so disposed on the main frame as to bring its laterally directed end portion 184 into operative relation to one of the rollers 173 whenever one of the reels is in operative position. The bell crank 174 is actuated by the swinging movement of the tension arm 5, the motion being transmitted by any suitable means, as for example, the flexible connection 185, the lever 186 and an adjustable connecting rod 187.

The tension of the wire tends to swing the arm 5 inwardly against the opposing action of the spring 7, which is carried by a keeper 188 pivoted to the main frame at 189 and slidably supported by a block 190, pivoted on a vertical axis 191 on the tension arm 5. The spring 7 is in compression between a shoulder 192 on the keeper 188 and the block 190 and urges the tension arm outward, this movement being limited by a collar 193 on the spring keeper 188.

Whenever the reel is supplying wire in excess of the demand, as for instance, during an idle period in the operation of the coiling mechanism, the tension in the wire is reduced thereby allowing the spring 7 to swing the tension arm 5 outwardly. Outward movement of the tension arm, through the connections shown, actuates the bell crank 174 and engages the brake 170 with the lower surface of the reel base plate 134 thereby retarding the motion of the reel and establishing the desired tension in the wire. Excessive braking action increases the tension in the wire, pulls the tension arm inwardly and releases the brake 170. By this means equilibrium is maintained between the tension spring 7 and the tension of the wire 45 being drawn around the tension arm. Whenever pull from the tension arm is released, the bell crank 174 is returned to inoperative position by suitable means as the spring 194 in tension between the bracket 175 and a lug 195 carried by the connecting rod 187.

If the wire should be placed under abnormal or undue stress, as for instance when wire becomes tangled in the reel, or if for any other reason the wire fails to feed from the bale, the tension arm 5 is pulled inwardly far enough to cause the end 196 of the arm to engage an electrical contact member 197 (see Figs. I and XV) thereby grounding or closing the electrical circuit in which the electro-magnet 40 is included. The energized electro-magnet actuates the automatic control mechanism previously described, to stop the machine. By means of the automatic stopping mechanism and the reel retarding device, movement of wire under desired tension is assured whenever the machine is in operation.

When a bale of wire has become exhausted, a loaded reel is automatically brought into operative position by mechanism which I shall now describe:

A bracket 198, vertically reciprocatable on the upright post 164, is connected to the reel-cover lifting chain 160 by any suitable connection as a rod 199 adjustably secured to the bracket by adjusting nuts 200 (see Figs. XVI, XXV and XXVII). By means of the chain 160 passing over the sheaves 162, a counterweight 201 normally holds the bracket 198 in its highest position against the stationary bracket 202, on the post 164, which constitutes a stop. The stationary bracket furnishes support for an upright bar 203 which serves as a guide against which a laterally projecting portion 204 of the sliding bracket 198 bears to prevent rotation of the latter on the post 164. When the bracket 198 is moved downward on the post 164 to its lower limit of movement, the cover 147 is lifted high enough to clear the reel while the latter is swinging from operative position to loading position.

When the sliding bracket 198 reaches the lower limit of movement, a pin 205 in the bracket engages a latch or locking dog 206 which forms a part of a bell crank pivoted at 207, with one end so constructed as to form a convenient foot lever or pedal 208 (see Figs. XVI, XXX and XXXI). The dog 206 is urged to engaging position by a spring 209 which is attached to the lever near the end 208 and anchored above to a suitable hanger 210 on the main frame. The locking dog holds the bracket 198 in lowered position until manually released by pressure on the pedal 208.

The sliding bracket 198 is automatically lowered when the last end of a bale of wire passes through the guide member 3. The guide 3 consists of guide bushings 211 and 212 mounted in a bracket 213 which is secured to the upright post 164, the bushing 211 preferably having a funnel shaped guide member 214 which aids in initial threading of the wire (see Fig. XXVI). A further purpose of the funnel shaped guide 214 is to straighten loops or entanglements that may be formed by excessive supply of wire from the reel (see dotted outline at 45' in Fig. XVI). The large entrance to the guide 214 obviates the possibility of kinks and consequent breakage of wire, while the tapered outer surface presents no projection on which the wire can become caught. However the brake 170 prevents the reel from over-running to any great extent.

A plunger 215, vertically reciprocatable in the bracket 213, carries a roller 216 over which the wire 45 normally passes. The sliding bracket 198 carries a tappet rod 217 which is vertically reciprocatable in guides 218 and 219 and is urged upward by a spring 220 in compression between the guide 218 and a head 221 on the tappet rod. With the bracket 198 in normal or highest position, the head of the tappet rod is in contact with the lower end of the plunger 215, the tappet rod being pushed downward in the bracket a certain distance against the pressure of the spring 220 (see Fig. XXIX). A rack 222 secured to the tappet rod 217 meshes with a segmental pinion 223 rotatably secured to a tappet 224 which is pivoted in suitable bearings in the laterally projecting portion 204 of the sliding bracket. Whenever wire is in place in the bushings 211 and 212 in the guide 3, the plunger 215 and likewise the tappet rod 217 is held down, thereby holding the tappet 224 in upright or vertical position. When wire becomes exhausted in guide 3, the last end passes from over the roller 216 leaving the plunger 215 free to slide upward in the guide bracket 213. This action permits the spring 220 to lift the tappet rod 217 and rack 222 to turn the tappet 224 to horizontal position (see Fig. XXX and dotted outline in Figs. XXIV, XXVII and XXIX). When in horizontal position the tappet 224 is in the path of a roller 225 mounted on the counter gear 226 which constitutes a part of the main driving gear train of the machine. The roller 225 engages the tappet during the first revolution of the gear 226 and slides the bracket 198 down on the post 164 to the position shown in Fig. XXX (also see dotted outline in Fig. XVI). As the bracket 198 is lowered, the tappet rod 217 drops away from the plunger 215, the latter being prevented from dropping out of assembly with the bracket 213 by an extended end portion of the roller pivot pin 227 resting in the bottom of a slot 228 in which the pin is free to move vertically as the plunger 215 is reciprocated. When locked in its lower position, the bracket 198 is so disposed in relation to the gear 226 that the roller 225 moves out of engagement with the tappet 224 and subsequent revolutions of the gear will not affect the position of the bracket (see diagrammatic outline at 229 in Fig. XXVII).

The carrier 168 is provided with a bearing sleeve 230 which is rotatable on the oblique standard 167 and is held in place between the thrust member 231 and frame member 232 in which the standard 167 is secured (see Fig. XXXIII). A gear 233 secured to the sleeve 230, meshes with a pinion 234 which is carried by a shaft 235 journaled in a bearing block 236 in the frame member 232. A worm wheel 237, also secured to the shaft 235, engages a worm 238 carried by a worm shaft 240 which is journaled in suitable bearings 239 in the frame member 232 (see Fig. XXIV). The gear 233 and pinion 234 are preferably covered by a shield 241 which is secured to the frame member 232 as by cap screws 242. The bearing block 236 is slidably mounted in the frame member 232 to permit adjustment of the position of the worm wheel in relation to the worm 238 by means of an adjusting screw 243. Rotation of the worm 238 and consequently the worm wheel 237, pinion 234 and gear 233, rotates the reel carrier 168 on the standard 167.

The worm shaft 240 projects some distance from the frame member 232 and near its end is enclosed by the sleeve-like portion of a driving clutch member 244 (see Fig. XXXIV). The clutch member 244 is held in position longitudinally against a flange 245 on the shaft 240, by a removable collar 246, the member 244 normally being free to rotate on the worm shaft while the latter remains stationary. The clutch member 244 receives rotary motion from a pulley 247 which is journaled in a bearing bracket 248 and driven by a belt 249 engaging the main drive pulley 17 (see Figs. I, XVI, XX and XXIV), the member 244 being rotatably connected to the pulley 247 by an intermediate shaft 250 and coupling 251 which is secured to the pulley shaft 252. The end portions of the shaft 250 are so formed as to make universal and telescopic connections with the clutch member 244 and coupling 251, so that while rotation of the connected parts is assured, perfect alignment of the bearing 248 with the worm shaft 240 need not necessarily be maintained. Any suitable form of universal coupling may be used. As a preferred from I have made the ends of the shaft 250 square in section to engage a corresponding socket in the clutch member 244 and coupling 251 (see Fig. XXXXI). The driving clutch member 244 rotates constantly on the end of the worm shaft 240 whenever the pulley 247 is being driven from the main drive pulley 17.

Driven clutch mechanism designated generally by the numeral 254 is formed in the flanges 245 and 255 of the worm shaft 240 to provide means of rotatably connecting the shaft to the driving clutch member 244. A dog 256, lying in a longitudinally disposed groove-like way 257 formed in the flanges 245 and 255 (see Figs. XXXIV to XXXX inclusive) is urged toward the driving clutch member 244 by a spring 258 which is contained in an appropriate recess in the dog 256 and is in compression between the dog and a cap 259. The cap 259 and a ring 260 on the flange 245 serve to retain the dog 256 in the groove-way, being thus effectively secured to the flanges 255 and 245 respectively.

The dog 256 is normally held in retracted position by a releasing member 261 which lies in a groove or annular space 262 between the flanges 245 and 255 and is adapted to engage a slot 263 in the dog. (see Figs. XXXIV, XXXV and XXXVIII). When in retracted position the dog 256 is out of range of driving pins 264 secured to the driving clutch member 244. If the releasing member 261 is lifted out of the slot 263 (see Figs. XXXVI, XXXX and also dotted outline in Fig. XXXV) the spring 258 projects the dog 256 so that the end portion of the latter is engaged by one of the pins 264, thereby rotatably connecting the worm shaft to the driving clutch member 244. The clutch members 244 and 254 remain operatively connected while the releasing member 261 is held away from the dog 256 but may be disconnected within one revolution by dropping the releasing member into range of the driven dog. As the dog 256 approaches the lowered releasing member (see Figs. XXXIX and XXXX) a rounded shoulder 265, which forms one side of the slot 263 engages a beveled or rounded surface of the member 261 which forces the dog into retracted position as the latter rotates, the dog being fully retracted when it engages the thickest part of the releasing member (see Figs. XXXVII and XXXVIII). When released, the driven clutch member is prevented from rotating out of engagement with the releasing member 261 by lugs or pins 266 engaging a shoulder 267 on the releasing member (see Fig. XXXVII).

The releasing member 261 is carried by a rock arm 268 which is secured to a rock shaft 269 mounted in suitable bearings 270 and 271 in the frame member 232 (see Figs. XX, XXIV and XXXIII). A bell crank lever 272 pivoted to the frame member 232 at 273 has one end connected to the extended end of the rock arm 268 by a link 274 which is so constructed as to form a counterweight. The other end of the bell crank carries a roller 275 normally bearing against a lateral face of the gear 233. A lug 276 on the rock arm 268 is adapted to engage a depression 277 in a segmental ring 278 which is secured to the worm wheel 237. The gear 233 is provided with diametrically opposite depressions 279 and 280, one of which receives the roller 275 whenever either of the reels is in operative position. The counterweight 274, besides holding the releasing member 261 in engagement with the clutch dog 256, causes the roller 275 and the lug 276 to enter the depressions in the gear 233 and worm wheel 237 and locate and maintain the correct position of the reel carrier 168.

An arm 281, on the rock shaft 269, overhangs the lateral portion 204 of the sliding bracket 198 (see Figs. XVI, XXIV, XXV, XXVII and XXVIII). A tripping member 282 which is pivoted at 283, in the bracket has a weighted portion so disposed as to normally hold the tripping member in contact with the upright bar 203. A pin 284, projecting from the tripping member overhangs the arm 281 whenever the sliding bracket 198 is in raised position. When the bracket 198 is forced downward to lift the cover from the reel, the pin 284 engages the arm 281 and rocks the latter a distance sufficient to lift the releasing member 261 out of engagement with the clutch dog 256, thereby throwing the reel swinging gears into action to rotate the carrier 168 and change the position of the reels. Movement of the rock arm 268 to cause engagement of the worm shaft clutch, also actuates the bell crank 272 so that the roller 275 and lug 276 release the carrier swinging gears and leave the carrier free to be rotated (see dotted outline in Fig. XXXIII).

The end of the arm 281 is rounded at the point engaged by the pin 284 and is so disposed in relation to the tripping member 282 that the pin slips off the end of the arm when the latter has reached its limit of movement and the resistance overcomes the action of the weighted member 282, the changed angularity of the arm aiding this action (see dotted outline in Fig. XXVII). The range of movement of the arm is limited by any suitable stop as contact of the rock arm 268 with the bell crank 272 (see Fig. XXXIII).

As the bracket 198 continues to slide downward, the tripping member 282 rocks back against the guide bar 203. The arm 281 is rocked upward by the counterweight 274 upon being released by the tripping pin 284. In the meantime, however, the gear 233 has been rotated an amount sufficient to carry the depression 279, for instance, away from the roller 275 so that the bell crank 272 is not permitted to return to normal position, by reason of the roller being in contact with a full section of the gear. Thus the releasing member 261 is held out of engagement with the clutch dog 256 and the clutch remains engaged. The carrier 168 continues to rotate until the depression 280 comes into position to receive the roller 275 and allow the lug 276 to drop into engagement with the segment 278 on the worm wheel. When the lug 276 enters the deepest part of the depression 277, the releasing member 261 is dropped into engagement with the clutch dog 256 to disconnect the clutch members. The position of the worm wheel has no effect on the position of the rock arm 268 while the roller 275 is not in either depression in the gear 233 but the time of disengaging the clutch is finally determined by engagement of the lug 276 with the depression in the worm wheel segment, which rotates at a higher rate than the gear 233, thereby providing a quicker action to the releasing means.

If the reel carrier swinging mechanism should accidentally be thrown into action by means other than exhaustion of a bale of wire, rotation of the carrier 168 with the cover 147 locked in position on the reel, possibly would result in breakage of parts. To guard against this trouble I have mounted the cover supporting arm 163 in rotatable relation to the post 164, the arm being normally held in correct radial position by a shear pin 285 which joins a flange in the hub of the arm to a companion flange on a collar 286 secured to the post 164. (See Figs. XVI and XXV.) A bell crank 287 pivoted at 288 is so disposed that a spring 289 in tension between one end of the bell crank and a stationary part of the machine, tends to swing the other end of the bell crank toward the drive belt 249. The bell crank is normally held away from the belt by the shear pin 285 to which the end of the bell crank is connected by a suitable cable 290. Rotation of the carrier 168 with the reel cover 147 locked in position swings the arm 163, thereby severing the pin 285 and allowing the bell crank 287 to throw the belt 249 off the pulley 247. This action disconnects the pulley 247 from the main drive pulley 17 and stops rotation of the reel carrier 168 before serious damage has been done.

After a loaded reel has been brought into operative position and the free end of the wire threaded through the guide 3, the pedal 208 is depressed allowing the counterweight 201 to slide the bracket 198 upward on the post 164 and lower the cover 147 into position on the reel. To prevent the counterweight and reel cover from dropping with undesirable force, I have provided a dash pot cylinder 291 which is secured to the post 164, (see Figs. XVI and XXXII), a piston 292 reciprocatable in the cylinder being adjustably connected to the sliding bracket 198 by a connecting rod 293. When the bracket 198 is lowered to lift the cover 147 and the piston 292 is pulled downward in the cylinder 291, air enters the upper portion of the cylinder through a port 294. When the bracket 198 slides upward to allow the cover 147 to be lowered the air displaced by the rising piston must leave the cylinder through the port 294 which being comparatively small in cross sectional area prevents rapid passage of air thereby compelling the cover to be lowered slowly.

As the bracket 198 approaches its highest position, the tripping pin 284 is brought into contact with a beveled edge 295 of the arm 281 which rocks the tripping member 282 enough to allow it to pass the end of the arm without affecting the position of the latter. The tripping member then rocks back against the bar 203 with the pin 284 in engaging position above the arm 281. When the bracket reaches its normal or raised position, the tappet rod 217 makes contact with the plunger 215 which is held down by wire in the guide 3, thereby pushing the tappet rod 217 downward in the bracket 198 and rotating the tappet 224 to vertical position out of range of the roller 225.

With a loaded reel in operative position, the cover locked in position on the reel and wire in all the guides leading to the coiling mechanism, the machine is ready to resume operation.

In the modification illustrated in Fig. XXXXII, I have shown mechanical means by which the tension arm 5 may stop the machine. The mechanism consists of a bell crank lever 297 pivoted on a bracket 298 with one end in range of the end 196 of the tension arm 5, the other end of the bell crank being adapted to engage a laterally projecting pin 299 on a downwardly extending portion 300 of the yoke 36. The bell crank lever is normally held in inoperative position by a spring 301 in compression between the bracket 298 and the upper arm of the bell crank, the spring being supported by a keeper 302 which extends through the crank arm and carries a stop nut 303 to limit the movement of the bell crank lever. As the bell crank is rocked against the pressure of the spring 301 by impact from the tension arm 5, the yoke 36 is moved downwardly thereby causing the machine to be stopped by means of the mechanism previously described.

The braking mechanism is of course applicable to revolving reels and to wire feeding devices wherein the swinging arm is omitted and in the modification shown in Fig. XXXXIII one form of such an arrangement is illustrated.

In this modification the braking face 305 of a reel 306 is engaged by the shoe 307 carried on the brake shoe spindle 308 which is reciprocated by a bell crank lever 311 in a guide bracket 309 on the spindle 310 which carries the reel. Wire guides 312 and guide rolls 313 support the wire 314 drawn from the reel, as by feed rolls 315, so as to pass over a roller 316 carried on a swinging arm 317, the roller 316 being held against the wire by a spring 318 and the arm 317 being coupled as by a link 319 with the bell crank 311 so that any movement of the roller 316 resultant from decrease in tension in the wire 314 and subsequent deflection under the pull of the spring 318, causes the brake shoe 307 to engage the brake face 305 of the reel and thereby retard the wire until equilibrium between the parts is re-established.

I have illustrated and described my improvements in an embodiment which I have found very practical and as I have embodied the same in a machine for the coiling of cushion, bed springs and the like.

I have not attempted to illustrate or described various modifications and adaptations which I contemplate, as I believe the disclosure made will enable those skilled in the art to which my invention relates to embody or adapt the same as may be desired.

The automatic stopping features of my improvements prevent breakage and also clogging of the machine. The parts are so arranged and assembled that the wire may be easily "threaded" into the machine for operation in starting a new bale, and this results in saving of time, which is greatly to be desired in an automatic machine of large capacity. The work may also be performed with a minimum amount of effort on the part of the operator.

Having thus described my invention, what I claim as new and desire to secure by Letters Patent is:

1. In a wire working machine, the combination with the feed means, of reels each adapted to receive a bale of wire and each comprising a hub member, radially disposed upwardly facing curved arms mounted on said hub member, a ring mounted on the outer ends of said arms, a cover, said arms being provided with bracket extensions at their inner ends on which said cover is supported when closed with its outer edge in spaced relation to said ring permitting the passage of a wire between the ring and cover, locking pins for holding said cover in closed position, springs acting to normally retract said locking pins, a locking plunger adapted when in projected position to actuate said locking pins to engaging position and when retracted to engage said cover for raising the same, an inclined reel supporting standard, a reel carrier rotatably mounted on said standard and having spindles for said reels disposed so that when one reel is in delivery position its axis is vertical and the axis of the other reel is inclined to facilitate loading, driving means for said carrier including a clutch, means for controlling said clutch comprising a wire guide member through which the wire drawn from the reel is passed, a plunger operatively associated with said wire guide member and adapted to be supported in one position by the wire passing through the guide member whereby upon the exhaustion of the wire said clutch is actuated to rotate said reel support, and means controlled by said plunger for automatically lifting said locking plunger whereby the cover is released and raised to permit the swinging of the support.

2. In a wire working machine, the combination with the feed means, of reels each adapted to receive a bale of wire and each comprising a hub member, radially disposed upwardly facing curved arms mounted on said hub member, a ring mounted on the outer ends of said arms, a cover, said arms being provided with bracket extensions at their inner ends on which said cover is supported when closed with its outer edge in spaced relation to said ring permitting the passage of a wire between the ring and cover, locking pins for holding said cover in closed position, springs acting to normally retract said locking pins, a locking plunger adapted when in projected position to actuate said locking pins to engaging position and when retracted to engage said cover for raising the same, a reel supporting standard, a carrier for said reels rotatably mounted on said standard, driving means for said carrier including a clutch, means for controlling said clutch comprising a wire guide member through which the wire drawn from the reel is passed, a plunger operatively associated with said wire guide member and adapted to be supported in one position by the wire passing through the guide member whereby upon the exhaustion of the wire said clutch is actuated to rotate said reel support, and means controlled by said plunger for automatically lifting said locking plunger whereby the cover is released and raised to permit the swinging of the support.

3. In a wire working machine, the combination with the feed means, of reels each adapted to receive a bale of wire, a cover, locking means for said cover, a locking plunger adapted when in projected position to actuate said locking means to engaging position and when retracted to engage said cover for raising the same, an inclined reel supporting standard, a reel carrier rotatably mounted on said standard and having spindles for said reels disposed so that when one reel is in delivery position its axis is vertical and the axis of the other reel is inclined to facilitate loading, driving means for said carrier including a clutch, means for controlling said clutch comprising a wire guide member through which the wire drawn from the reel is passed, a plunger operatively associated with said wire guide member and adapted to be supported in one position by the wire passing through the guide member whereby upon the exhaustion of the wire said clutch is actuated to rotate said reel support, and means controlled by said plunger for automatically lifting said locking plunger whereby the cover is released and raised to permit the swinging of the support.

4. In a wire working machine, the combination with the feed means, of reels each adapted to receive a bale of wire, a cover, locking means for said cover, a locking plunger adapted when in projected position to actuate said locking means to engaging position and when retracted to engage said cover for raising the same, a reel supporting standard, a carrier for said reels rotatably mounted on said standard, driving means for said carrier including a clutch, means for controlling said clutch comprising a wire guide member through which the wire drawn from the reel is passed, a plunger operatively associated with said wire guide member and adapted to be supported in one position by the wire passing through the guide member whereby upon the exhaustion of the wire said clutch is actuated to rotate said reel support, and means controlled by said plunger for automatically lifting said locking plunger whereby the cover is released and raised to permit the swinging of the support.

5. In a wire working machine, the combination with the feed means, of a rotatably mounted reel adapted to receive a bale of wire and comprising radially disposed upwardly facing curved arms, a ring mounted on the outer ends of said arms, a cover, said arms being provided with bracket extensions at their inner ends on which said cover is supported when closed with its outer edge in spaced relation to said ring permitting the passage of a wire between the ring and cover, locking pins for holding said cover in closed position, springs acting to normally retract said locking pins, and a locking plunger adapted when in projected position to actuate said locking pins to engaging position and when retracted to engage said cover for raising the same.

6. In a wire working machine, the combination with the feed means, of a reel comprising radially disposed upwardly facing curved arms adapted to loosely support a bale of wire, a vertically disposed spindle for said reel, a ring mounted on the outer ends of said arms, a cover, said arms being provided with bracket extensions at their inner ends on which said cover is supported when closed with its outer edge in spaced relation to said ring permitting the passage of a wire between the ring and cover.

7. In a wire working machine, the combination with the feed means, of a rotatably mounted reel adapted to receive a bale of wire, a cover supported when closed with its outer edge in spaced relation to said reel permitting the passage of a wire between the reel and cover, locking means for holding said cover in closed position, and a member adapted when in projected position to actuate said locking means to engaging position and when retracted to engage said cover for raising the same.

8. In a wire working machine, the combination with the feed means, of a reel adapted to loosely support a bale of wire in a horizontal position, a vertical spindle for said reel, a cover supported when closed with its outer edge in spaced relation to said reel permitting the passage of a wire between the reel and cover.

9. In a wire working machine, the combination with a wire feed means, of reels each adapted to receive a bale of wire, a rotatable carrier on which said reels are mounted, a cover adapted to successively coact with the reels as they are brought to discharging position, means for locking said cover in closed position, means for raising said cover comprising a slide bracket, a tappet pivotally mounted on said bracket and provided with a segment, a plunger provided with a rack coacting with said segment, a spring for actuating said plunger, said plunger being normally held in position to hold said tappet in inoperative position by means of the wire drawn from the reel whereby when the wire is exhausted the tappet is actuated to operative position, a driven member coacting with said tappet to reciprocate said slide bracket, connections for said bracket to said cover provided with a counterweight and operatively connected to said cover locking means whereby the cover is unlocked and raised, a manually actuated catch for holding said slide bracket in retracted position, a dash-pot checking the return of said slide bracket, means for driving said reel carrier, and control means therefor including said slide bracket.

10. In a wire working machine, the combination with a wire feed means, of reels each adapted to receive a bale of wire, a rotatable carrier on which said reels are mounted, a cover adapted to successively coact with the reels as they are brought to discharging position, means for locking said cover in closed position, means for raising said cover comprising a slide bracket, a tappet pivotally mounted on said bracket and provided with a segment, a plunger provided with a rack coacting with said segment, a spring for actuating said plunger, said plunger being normally held in position to hold said tappet in inoperative position by means of the wire drawn from the reel whereby when the wire is exhausted the tappet is actuated to operative position, a driven member coacting with said tappet to reciprocate said slide bracket, connections for said bracket to said cover operatively connected to said cover locking means whereby the cover is unlocked and raised, and a manually actuated catch for holding said slide bracket in retracted position, means for driving said reel carrier, and control means therefor including said slide bracket.

11. In a wire working machine, the combination with a wire feed means, of reels each adapted to receive a bale of wire, a rotatable carrier on which said reels are mounted, a cover adapted to successively coact with the reels as they are brought to discharging position, means for raising said cover comprising a slide bracket, a tappet pivotally mounted on said bracket and provided with a segment, a plunger provided with a rack coacting with said segment, a spring for actuating said plunger, said plunger being normally held in position to hold said tappet in inoperative position by means of the wire drawn from the reel whereby when the wire is exhausted the tappet is actuated to operative position, a driven member coacting with said tappet to reciprocate said slide bracket, connections for said bracket to said cover provided with a counterweight and a dash-pot checking the return of said slide bracket, means for driving said reel carrier, and control means therefor including said slide bracket.

12. In a wire working machine, the combination with a wire feed means, of reels each adapted to receive a bale of wire, a rotatable carrier on which said reels are mounted, means for driving said reel carrier, a cover adapted to successively coact with the reels as they are brought to discharging position, means for raising said cover comprising a slide member operatively connected to said cover, means for controlling said slide member comprising a plunger, said plunger being normally held in one position by means of the wire drawn from the reel whereby when the wire is exhausted the slide member is actuated, a manually actuated catch for holding said slide member in retracted position, and control means for said carrier driving means including said slide member.

13. In a wire working machine, the combination with a wire feed means, of reels each adapted to receive a bale of wire, a rotatably mounted reel carrier, means for driving said reel carrier, a cover adapted to successively coact with the reels as they are brought to discharging position, means for raising said cover comprising a slide member operatively connected to said cover, means for controlling said slide member comprising a plunger, said plunger being normally held in one position by means of the wire drawn from the reel whereby when the wire is exhausted the slide member is actuated, and control means for said carrier driving means including said slide member.

14. In a wire working machine, the combination with a wire feed means, of reels each adapted to receive a bale of wire, a rotatable carrier on which said reels are mounted, means for driving said reel carrier, a cover adapted to successively coact with the reels as they are brought to discharging position, means for raising said cover comprising a slide member operatively connected to said cover, means for controlling said slide member comprising a plunger, said plunger being normally held in one position by means of the wire drawn from the reel whereby when the wire is exhausted the slide member is actuated, and a manually actuated catch for holding said slide member in retracted position.

15. In a wire working machine, the combination with a wire feed means, of reels each adapted to receive a bale of wire, a rotatable carrier on which said reels are mounted, means for driving said reel carrier, a cover adapted to successively coact with the reels as they are brought to discharging position, means for raising said cover comprising a slide member operatively connected to said cover, means for controlling said slide member comprising a plunger, said plunger being normally held in one position by means of the wire drawn from the reel whereby when the wire is exhausted the slide member is actuated.

16. In a wire working machine, the combination with the feed means, of reels each adapted to receive a bale of wire, a cover, means for locking said cover in closed position, means for raising said cover, an inclined reel supporting standard, a reel carrier rotatably mounted on said standard and having spindles for said reels disposed so that when one reel is in delivery position its axis is vertical and the axis of the other reel is inclined to facilitate loading, means for controlling said driving means comprising a wire guide member through which the wire drawn from the reel is passed, a plunger operatively associated with said wire guide member and adapted to be supported in one position by the wire passing through the guide member whereby upon the exhaustion of the wire said reel driving means is actuated to rotate said reel support, and means controlled by said plunger for unlocking and lifting said cover to permit the swinging of the support.

17. In a wire working machine, the combination with the feed means, of reels each adapted to receive a bale of wire, an inclined reel supporting standard, a reel carrier rotatably mounted on said standard and having spindles for said reels disposed so that when one reel is in delivery position its axis is vertical and the axis of the other reel is inclined to facilitate loading, means for driving said carrier, means for controlling said driving means comprising a wire guide member through which the wire drawn from the reel is passed, a plunger operatively associated with said wire guide member and adapted to be supported in one position by the wire passing through the guide member whereby upon the exhaustion of the wire said reel driving means is actuated to rotate said reel support.

18. In a wire working machine, the combination with the feed means, of reels each adapted to receive a bale of wire, a cover, means for locking said cover in closed position, means for raising said cover, a reel carrier on which said reels are mounted, means for driving said carrier, means for controlling said driving means comprising a wire guide member through which the wire drawn from the reel is passed, a plunger operatively associated with said wire guide member and adapted to be supported in one position by the wire passing through the guide member whereby upon the exhaustion of the wire said reel driving means is actuated to rotate said reel support, and means controlled by said plunger for unlocking and lifting said cover to permit the swinging of the support.

19. In a wire working machine, the combination with the feed means, of reels each adapted to receive a bale of wire, a reel carrier on which said reels are mounted, means for driving said carrier, means for controlling said driving means, comprising a wire guide member through which the wire drawn from the reel is passed, a plunger operatively associated with said wire guide member and adapted to be supported in one position by the wire passing through the guide member whereby upon the exhaustion of the wire said reel driving means is actuated to rotate said reel support.

20. In a wire working machine, the combination with a wire feed means, of reels each adapted to receive a bale of wire, a reel carrier, means for driving said reel carrier, and means for controlling said reel carrier driving means comprising a member normally held in one position by the wire drawn from the reel whereby when the wire is exhausted the reel driving means is actuated.

21. In a wire working machine, the combination with a wire feed means, of reels each adapted to receive a bale of wire, a rotatably mounted reel carrier, means for driving said reel carrier, and means for controlling said reel carrier driving means comprising a member controlled by the wire drawn from the reel.

22. In a structure of the class described, the combination with a wire feed means, of reels, a rotatably mounted carrier for said reels, driving means for said carrier comprising a gear secured thereto, said gear having stop recesses in its lower edge, a pivoted stop lever adapted to engage said recesses when the carrier is in reel discharging position, a driving clutch, a clutch release member, and a link connecting said stop and clutch release levers whereby the clutch is disengaged when the stop lever engages said stop recesses.

23. In a structure of the class described, the combination with a wire feed means, of reels, a rotatably mounted carrier for said reels, driving means for said carrier comprising a clutch, a control means for said clutch, a stop means for said reel, and operating connections for said stop means and clutch control means whereby the clutch is disengaged by the engagement of said stop means.

24. In a structure of the class described, the combination of a plurality of reels adapted to receive bales of wire and comprising curved upwardly facing radially disposed arms in which the bales may be laid, a carrier for said reels, an inclined standard on which said carrier is mounted, and reel spindles on said carrier disposed so that when in one position the spindle of one carrier is vertical and the spindle of the other carrier is inclined to facilitate the placing of a bale within the reel.

25. In a structure of the class described, the combination of a plurality of reels adapted to receive bales of wire, a carrier for said reels, an inclined standard on which said carrier is mounted, and reel spindles on said carrier disposed so that when in one position the spindle of one carrier is vertical and the spindle of the other carrier is inclined to facilitate the placing of a bale within the reel.

26. In a structure of the class described, the combination of a reel comprising curved upwardly facing radially disposed arms adapted to loosely receive a bale of wire, a vertical spindle for said reel, a cover, and means for supporting said cover with its rim in spaced relation to the rim of said reel permitting a wire to be drawn between the same and over the rim of the reel.

27. In a structure of the class described, the combination of a horizontally disposed rotatably supported reel comprising an annular trough in which the bale may be laid and having a continuous outer rim, a cover, and means for supporting said cover with its rim in spaced relation to the rim of said reel permitting a wire to be drawn between the same and over the rim of the reel.

28. In a structure of the class described, the combination of a horizontally disposed rotatably supported reel comprising curved upwardly facing radially disposed arms providing a support in which a bale may be laid, and a ring connecting the outer ends of said arms so that the wire may be drawn from the bale over the rim of the reel as the reel revolves.

29. In a wire working machine, the combination of a rotatably mounted reel comprising a base plate and curved upwardly facing arms disposed radially thereof, a wire feed means for drawing the wire from said reel, a brake shoe coacting with said base plate, and means for controlling said brake shoe including a member controlled by the wire drawn from the reel and actuated by excess of slack in the wire to engage the brake.

30. In a structure of the class described, the combination with reels, of a carrier upon which said reels are mounted, a cover adapted to successively coact with said reels as they are brought to discharging position, means for supporting said cover in inoperative position to permit the swinging of the reels, comprising a standard, a swinging arm on said standard, a cover supporting cable carried by said arm, a shear pin for locking said arm in normal position, means for driving said carrier comprising a belt, a belt throwing lever, and means for holding said belt throwing lever in inoperative position comprising said shear pin.

31. In a structure of the class described, the combination with reels, of a carrier upon which said reels are mounted, a cover adapted to successively coact with said reels as they are brought to discharging position, means for supporting said cover in inoperative position to permit the swinging of the reels, comprising a standard, a swinging arm on said standard, a cover supporting cable carried by said arm, a shear pin for locking said arm in normal position, means for driving said carrier, and means for disengaging said driving means comprising said shear pin.

32. In a structure of the class described, the combination with reels, of a carrier upon which said reels are mounted, a cover adapted to successively coact with said reels as they are brought to discharging position, means for locking said cover in closed position, means for supporting said cover in inoperative position to permit the swinging of the reels, means for driving said carrier, and means for disconnecting said driving means comprising said cover support whereby when said reel carrier is driven with said cover in closed position, said driving means is automatically disengaged.

33. In a structure of the class described, the combination of a rotatably mounted reel adapted to receive a bale of wire and comprising a plurality of radially disposed upwardly facing curved arms, a ring mounted on the outer ends of said arms, the inner portions of the arms having downwardly facing shoulders adjacent their upper ends limiting the upward movement of the wire drawn from the reel, and a cover detachably mounted on said reel so that when closed its outer edge is supported in a spaced relation to said ring.

34. In a structure of the class described, the combination of a rotatably mounted reel adapted to receive a bale of wire and comprising a plurality of radially disposed upwardly facing curved arms, a ring mounted on the outer ends of said arms, the inner portions of the arms having downwardly facing shoulders adjacent their upper ends limiting the upward movement of the wire drawn from the reel.

35. In a structure of the class described, the combination of a rotatably mounted reel adapted to receive a bale of wire and comprising a plurality of radially disposed upwardly facing arms, and a ring mounted on the outer ends of said arms, the inner portions of the arms having projecting parts adjacent their upper ends limiting the upward movement of the wire thereon.

36. In a structure of the class described, the combination of a rotatably supported reel adapted to support a bale of wire loosely therein and having a rim over which the wire may be drawn and having an upwardly tapered central portion provided with an overhang at the top limiting the upward movement of the wire thereon as it uncoils from the bale.

37. In a structure of the class described, the combination of a rotatably supported reel adapted to support a bale of wire loosely therein and having a rim over which the wire may be drawn and having a central portion provided with an overhang at the top limiting the upward movement of the wire thereon as it uncoils from the bale.

38. In a wire working machine the combination with a wire feed means, of reels each adapted to receive a bale of wire, a rotatable carrier for said reels whereby the reels may be successively brought to operative position, a brake operatively associated with each reel, and means for controlling said brakes when the reels are in operative position including a member controlled by the wire drawn from the reel and actuated by excess slack in the wire to engage the brake.

39. In a wire working machine the combination with a wire feed means, of reels each adapted to receive a bale of wire, a rotatable carrier for said reels whereby the reels may be successively brought to operative position, a brake operatively associated with each reel, and brake controlling means including a member controlled by the wire drawn from the reel and actuated by excess slack in the wire, said brakes being brought into operative relation with said operating means by rotation of said carrier.

In witness whereof, I have hereunto set my hand and seal.

BERT L. VAN ORMAN. [L. S.]